(12) United States Patent
Tian

(10) Patent No.: US 11,407,508 B2
(45) Date of Patent: Aug. 9, 2022

(54) VERTICAL TAKEOFF AND LANDING AERIAL VEHICLE

(71) Applicant: Shanghai Autoflight Co., Ltd., Shanghai (CN)

(72) Inventor: Yu Tian, Hong Kong SAR (CN)

(73) Assignee: SHANGHAI AUTOFLIGHT CO., LTD., Shanghai (CN)

(*) Notice: Subject to any disclaimer, the term of this patent is extended or adjusted under 35 U.S.C. 154(b) by 0 days.

(21) Appl. No.: 17/396,708

(22) Filed: Aug. 8, 2021

(65) Prior Publication Data

US 2021/0362850 A1 Nov. 25, 2021

Related U.S. Application Data

(63) Continuation-in-part of application No. 16/281,020, filed on Feb. 20, 2019, now abandoned.

(30) Foreign Application Priority Data

Aug. 7, 2020 (CN) .......................... 202021631662.6
Oct. 29, 2020 (CN) .......................... 202022448151.7

(51) Int. Cl.
*B64C 29/00* (2006.01)
*B64C 39/02* (2006.01)

(52) U.S. Cl.
CPC ........ *B64C 29/0025* (2013.01); *B64C 39/024* (2013.01); *B64C 2201/027* (2013.01); *B64C 2201/126* (2013.01); *B64C 2201/128* (2013.01); *B64C 2211/00* (2013.01)

(58) Field of Classification Search
CPC ........................ B64C 29/0016; B64C 29/0025
See application file for complete search history.

(56) References Cited

U.S. PATENT DOCUMENTS 5,240,207 A * 8/1993 Eiband ................. G05D 1/0038
244/190
2018/0215465 A1* 8/2018 Renteria ................. B64C 27/28

* cited by examiner

*Primary Examiner* — Nicholas McFall
(74) *Attorney, Agent, or Firm* — WPAT Law, P.C.; Anthony King

(57) ABSTRACT

A vertical takeoff and landing aerial vehicle, which comprises a plurality of lift propellers respectively arranged at the top sides of a left linear support and a right linear support, and a left additional lift propeller and a right additional lift propeller respectively arranged on the bottom sides of the left linear support and the right linear support. According to the aerial vehicle provided by the disclosure, the takeoff and landing power of the aerial vehicle is effectively improved and the maximum take-off weight and effective load of the aerial vehicle are improved by using multiple groups of lift motors on the aerial vehicle.

24 Claims, 20 Drawing Sheets

VERTICAL TAKEOFF AND LANDING AERIAL VEHICLE

TECHNICAL FIELD

The disclosure relates to the technology of unmanned aerial vehicles, and in particular to a vertical takeoff and landing unmanned aerial vehicle.

BACKGROUND

The takeoff weight of an existing large-load vertical takeoff and landing (VTOL) unmanned aerial vehicle limits the task load, the effective task load provided by lift in the level flight process can be greatly increased by increasing the takeoff weight, but the maximum takeoff weight and the effective load of the existing unmanned aerial vehicle are insufficient.

SUMMARY

The disclosure relates to a vertical takeoff and landing unmanned aerial vehicle, which is used for solving the problem that the maximum takeoff weight and the effective load of the existing unmanned aerial vehicle are insufficient in the prior art.

The disclosure provides a vertical takeoff and landing unmanned aerial vehicle, which comprises:

a left main wing and a right main wing;

a main body which is engaged with the left main wing and the right main wing;

a left front wing and a right front wing which are engaged with the main body;

a left linear support which is engaged with the left main wing;

a first group of multiple lift propellers which are arranged on the top side of the left linear support;

a right linear support which is engaged with the right main wing;

a second group of multiple lift propellers which are arranged on the top side of the right linear support;

a left additional lift propeller which is arranged on the bottom side of the left linear support; and a right additional lift propeller which is arranged on the bottom side of the right linear support.

In one embodiment of the disclosure, a rotation coverage area of the left additional lift propeller overlaps with rotation coverage areas of two lift propellers in the first group of multiple lift propellers.

In one embodiment of the disclosure, the rotation coverage area of the left additional lift propeller overlaps with rotation coverage areas of the first two lift propellers in the first group of multiple lift propellers.

In one embodiment of the disclosure, the unmanned aerial vehicle further comprises a left vertical stabilizer which is arranged at a position close to the tail end of the left linear support, and a right vertical stabilizer which is arranged at a position close to the tail end of the right linear support.

In one embodiment of the disclosure, the unmanned aerial vehicle further comprises a top end lift propeller which is arranged at the top end of each of the left vertical stabilizer and the right vertical stabilizer.

In one embodiment of the disclosure, the unmanned aerial vehicle further comprises two wingtip propellers, wherein the two wingtip propellers are respectively arranged at the end parts, away from the main body, of the left main wing and the right main wing.

In one embodiment of the disclosure, one end, away from the main body, of each of the left main wing and the right main wing is provided with a wingtip vertical stabilizer, the wingtip vertical stabilizer is a plate-shaped structure which is vertically arranged and parallel to the longitudinal axis of the main body, the wingtip vertical stabilizer is located on the main wing and fixedly connected with the main wing, and the wingtip propeller is arranged at the top end of the wingtip vertical stabilizer.

In one embodiment of the disclosure, the unmanned aerial vehicle further comprises a traction propeller which is arranged at the front end of the main body.

In one embodiment of the disclosure, the unmanned aerial vehicle further comprises a propulsion propeller which is arranged at the rear end of the main body.

In one embodiment of the disclosure, the left main wing is connected to the left front wing through the left linear support, and the right main wing is connected to the right front wing through the right linear support.

In one embodiment of the disclosure, the unmanned aerial vehicle further comprises a pod which is attached to the bottom side of the main body.

In one embodiment of the disclosure, the pod is a passenger pod.

In one embodiment of the disclosure, the pod is a cargo pod.

In one embodiment of the disclosure, the ratio of the weight increase percentage of the left additional lift propeller and the right additional lift propeller to the increase percentage of takeoff and landing power is 5-15%: 18-35%.

In one embodiment of the disclosure, the ratio of the weight increase percentage of the left additional lift propeller and the right additional lift propeller to the lift increase percentage is 5-10%: 18-30%.

In one embodiment of the disclosure, the ratio of the weight increase percentage of the left additional lift propeller and the right additional lift propeller to the lift increase percentage is 6%: 20-25%.

In one embodiment of the disclosure, the ratio of the weight increase percentage of the left additional lift propeller and the right additional lift propeller to the lift increase percentage is 6%: 22%.

The disclosure provides a vertical takeoff and landing unmanned aerial vehicle, which comprises a left main wing and a right main wing; a main body which is engaged with the left main wing and the right main wing; a left front wing and a right front wing which are engaged with the main body; a left linear support which is engaged with the left main wing; a first group of multiple lift propellers which are arranged on the top side of the left linear support; a right linear support which is engaged with the right main wing; a second group of multiple lift propellers which are arranged on the top side of the right linear support; a left additional lift propeller which is arranged on the bottom side of the left linear support; and a right additional lift propeller which is arranged on the bottom side of the right linear support. According to the unmanned aerial vehicle provided by the disclosure, the takeoff and landing power of the unmanned aerial vehicle is effectively improved and the maximum take-off weight and effective load of the unmanned aerial vehicle are improved by using multiple groups of lift motors on the unmanned aerial vehicle.

Although this specification includes many specific implementation details, these should not be construed as limitations on the scope of any disclosure or of what may be claimed, but rather as descriptions specific to features of particular implementations of particular embodiments. Certain features that are described in the context of different implementations in this specification may also be implemented in combination in a separate implementation. In contrast, various features described in the context of the separate implementation may also be implemented in multiple implementations separately or in any appropriate sub-combination. In addition, although the features may be described above and below as acting in certain combinations and even initially described as such, one or more features from a described/claimed combination may be excised from the combination in certain cases, and the described/claimed combination may be directed to a sub-combination or variations of the sub-combination.

Many implementations have been described. However, it should be understood that various modifications may be made without departing from the spirit and scope of the disclosure. For example, the example operations, methods, or processes described herein may comprise more steps or less steps than those described. In addition, the steps in these example operations, methods, or processes may be performed in different alternative ways than those described or illustrated in the figures The details of one or more implementations of a subject matter described in the disclosure are set forth in the accompanying drawings and the description below. Other features, aspects and advantages of the subject matter will become apparent in accordance with the specification, the accompanying drawings, and the technical solutions.

BRIEF DESCRIPTION OF THE DRAWINGS

It should be noted that the accompanying drawings may be in simplified form and may not be precise in scale. With reference to the disclosure herein, for purposes of convenience and clarity only, directional terms such as top, bottom, left, right, up, down, upper side, above, beneath, below, rear portion, front portion, distal end, and proximal end are used with reference to the accompanying drawings. These directional terms should not be construed to limit the scope of the embodiments in any way.

Where reference is made to components with reference numerals, like parts are denoted by the same reference numerals throughout the accompanying drawings of the specification.

Figure 1A:
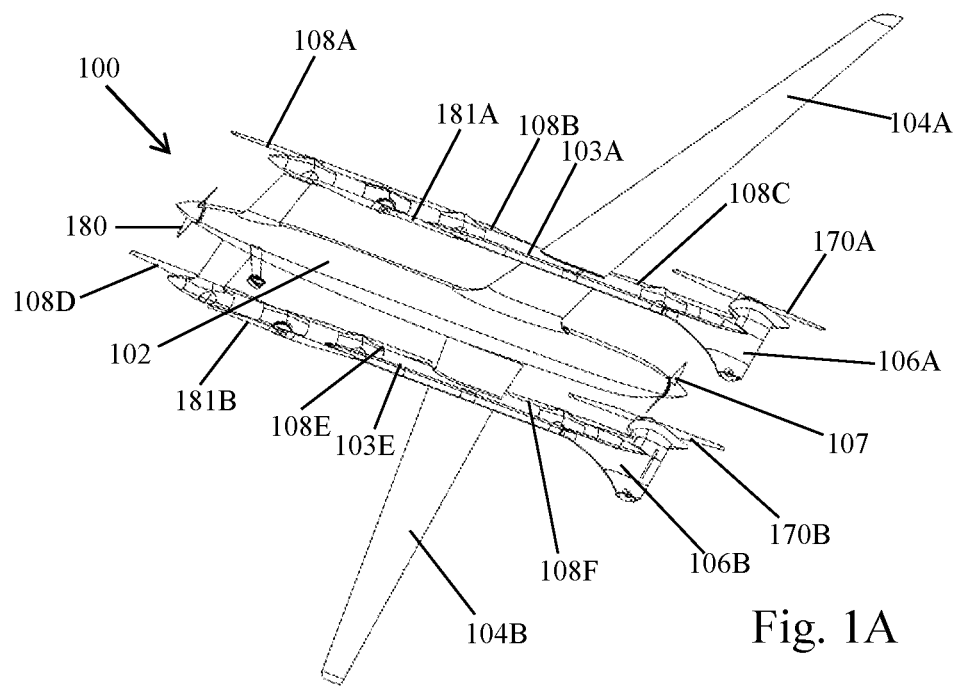
FIG. 1a is a top perspective view of an embodiment of a VTOL unmanned aircraft system in accordance with one aspect of an embodiment.

100—unmanned aerial vehicle; 101—flight platform; 102—main body; 103A—left linear support; 103B—right linear support; 104A—left main wing; 104B—right main wing; 105A—left front wing; 105B—right front wing; 106A—left vertical stabilizer; 106B—right vertical stabilizer; 107—propulsion propeller; 107A—left propulsion propeller; 107B—right propulsion propeller; 108A—first lift propeller; 108B—second lift propeller; 108C—third lift propeller; 108D—fourth lift propeller; 108E—fifth lift propeller; 108F—sixth lift propeller; 109A—left wingtip propeller; 109B—right wingtip propeller; 110A—left wingtip vertical stabilizer; 110B—right wingtip vertical stabilizer; 111A—left folding leg; 111B—right folding leg; 112A—first leaf spring; 112B—second leaf spring; 112C—third leaf spring; 112D—fourth leaf spring; 116—vertical expander; 117—central propulsion propeller; 130—cargo pod; 135A—first pod leaf spring; 135B—second pod leaf spring; 135C—third pod leaf spring; 135D—fourth pod leaf spring; 140—passenger pod; 145A—pod leg; 145B—pod leg; 145C—pod leg; 145D—pod leg; 147—pod-attaching latch; 148—electric wheel; 149—shell; 150—energy storage unit in flight platform; 155—energy storage unit in pod; 160—flotation device; 170A—top end lift propeller; 170B—top end lift propeller; 180—traction propeller; 181A—left additional lift propeller; 181B—right additional lift propeller; 190—aileron.

DETAILED DESCRIPTION OF THE EMBODIMENTS

Different aspects of various embodiments may now be better understood by turning to the following detailed description of the embodiments, which are presented as illustrative examples of the embodiments defined in the technical solutions. It is expressly understood that the embodiments defined by the technical solutions may be broader than the illustrated embodiments described below.

The words used in the specification to describe the various embodiments should be understood to not only have commonly defined meanings thereof, but, in structure, material, or actions in the specification, to include special definitions beyond the scope of the generally defined meanings. Thus, if a component may be understood in the context of the specification to include more than one meaning, its use in the technical solution must be understood to be general for all possible meanings supported by the specification and the words themselves.

The term "unmanned aerial vehicle" is defined as a flight transportation system with at least one propeller as one propulsion source. The term "unmanned aerial vehicle" may comprise both "manned" and "unmanned" flight transportation systems. The "manned" unmanned aerial vehicle may refer to a flight transportation system that carries human passengers, none of which has right of control over the unmanned aerial vehicle. The "manned" unmanned aerial vehicle may also refer to a flight transportation system that carries human passengers, with some or one of the human passengers having a certain right of control over the unmanned aerial vehicle.

As the background, the maximum takeoff weight and the effective load of the existing vertical takeoff and landing unmanned aerial vehicle are insufficient. To solve the problem, the disclosure provides a vertical takeoff and landing unmanned aerial vehicle, which comprises: a left main wing and a right main wing; a main body which is engaged with the left main wing and the right main wing; a left front wing and a right front wing which are engaged with the main body; a left linear support which is engaged with the left main wing; a first group of multiple lift propellers which are arranged on the top side of the left linear support; a right linear support which is engaged with the right main wing; a second group of multiple lift propellers which are arranged on the top side of the right linear support; a left additional lift propeller which is arranged on the bottom side of the left linear support; and a right additional lift propeller which is arranged on the bottom side of the right linear support.

The technical solutions of the disclosure will be described below in detail in conjunction with specific accompanying drawings.

Figure 1B:
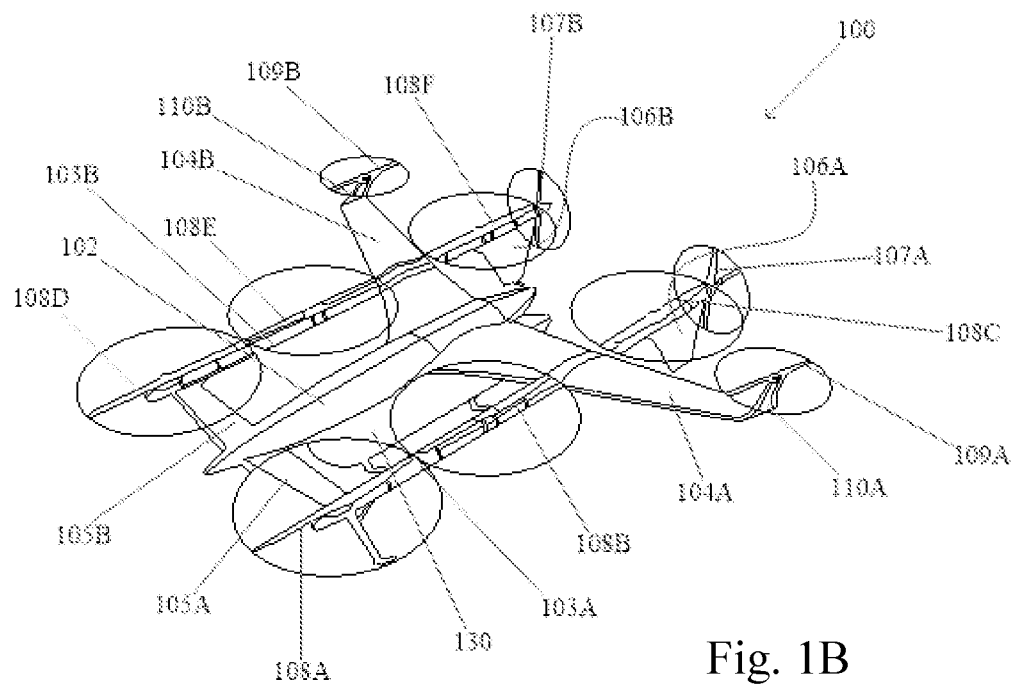
FIG. 1b is a top perspective view of an embodiment of a VTOL unmanned aircraft system in accordance with still another aspect of an embodiment.
Figure 2:
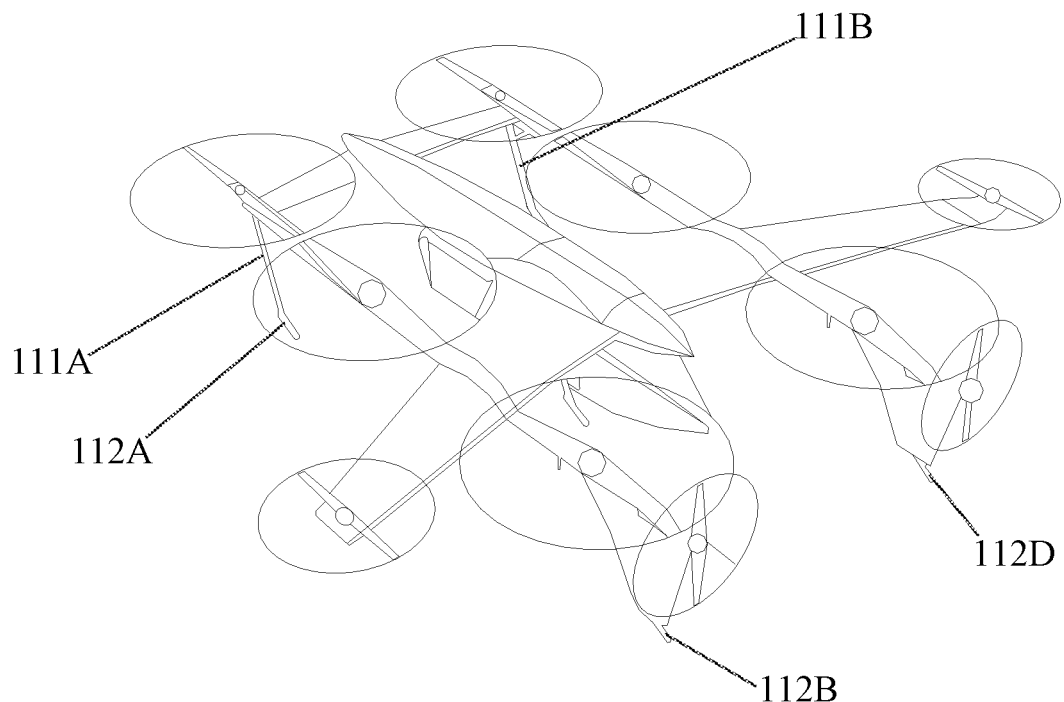
FIG. 2 is a top rear perspective view of the unmanned aircraft system of FIG. 1b.
Figure 3:
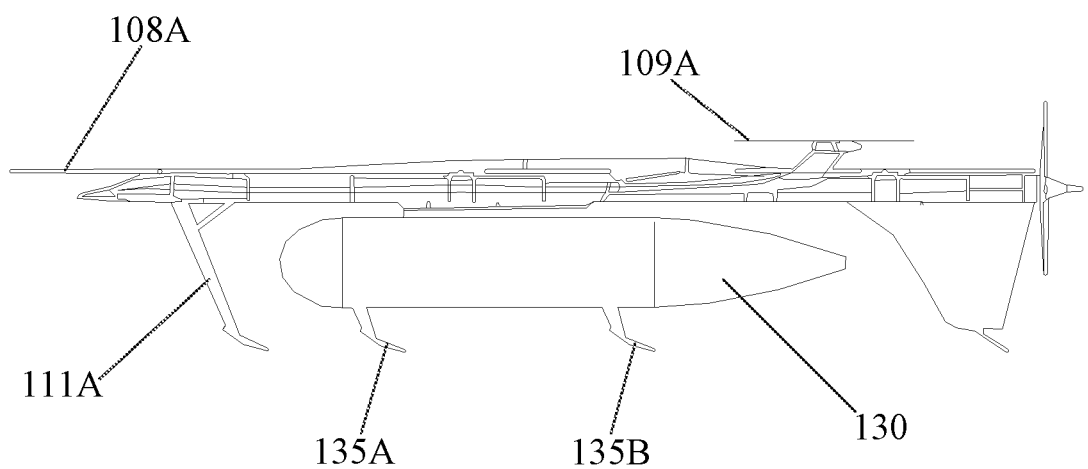
FIG. 3 is a side view of the unmanned aircraft system of FIG. 1b.
Figure 4:
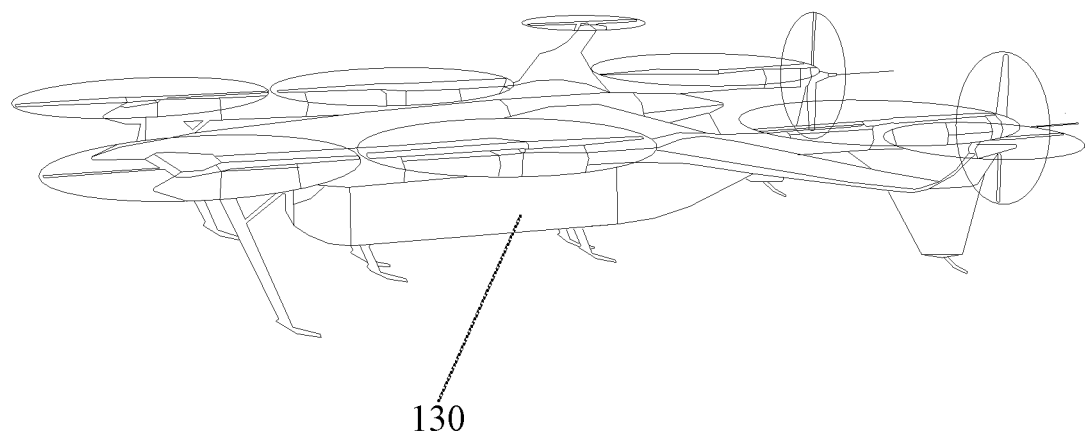
FIG. 4 is a top perspective view of another embodiment of a VTOL unmanned aircraft system with a flight platform and a detachably attached pod in accordance with one aspect of the embodiment.
Figure 5:
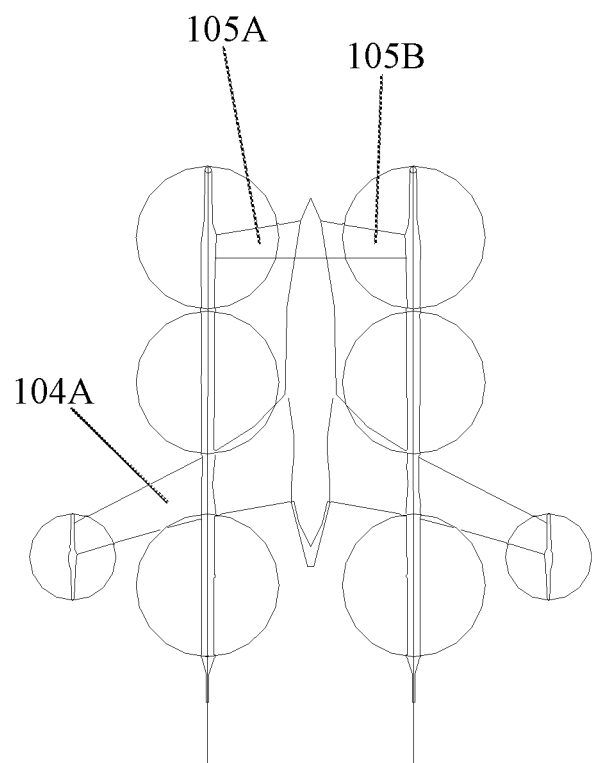
FIG. 5 is a top view of the unmanned aircraft system of FIG. 4 in accordance with one aspect of the embodiment.
Figure 6:
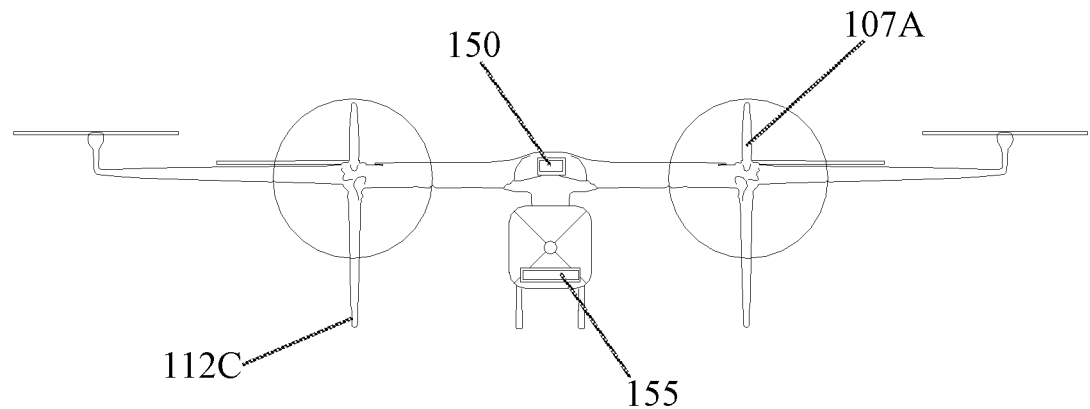
FIG. 6 is a front view of the unmanned aircraft system of FIG. 4 in accordance with one aspect of the embodiment.
Figure 7:
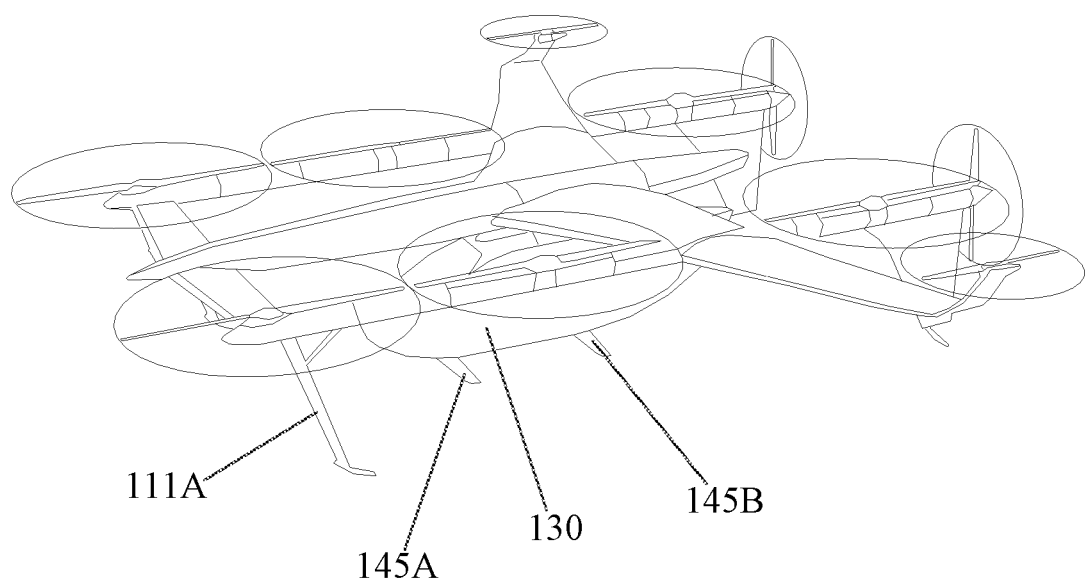
FIG. 7 is a top perspective view of an embodiment of a VTOL unmanned aircraft system with a flight platform and a detachably attached passenger pod in accordance with one aspect of the embodiment.
Figure 8:
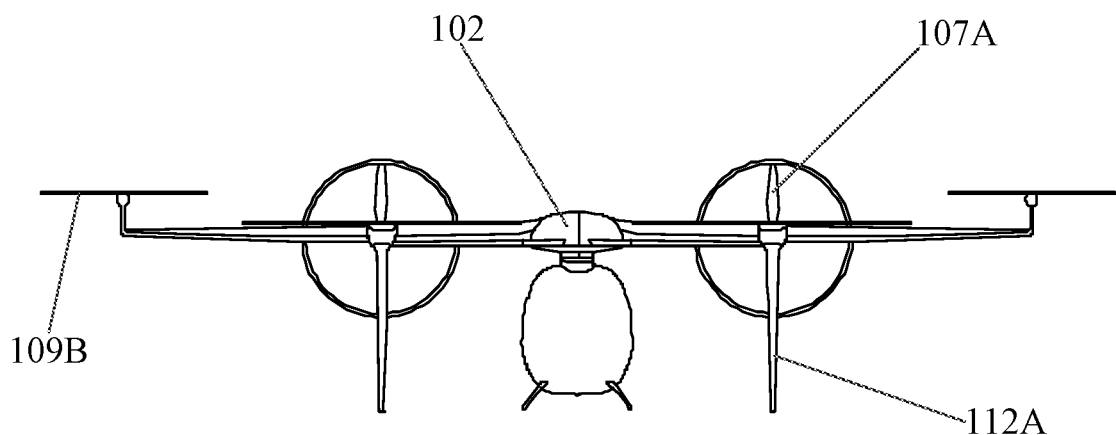
FIG. 8 is a front view of the unmanned aircraft system of FIG. 7 in accordance with one aspect of the embodiment.
Figure 9:
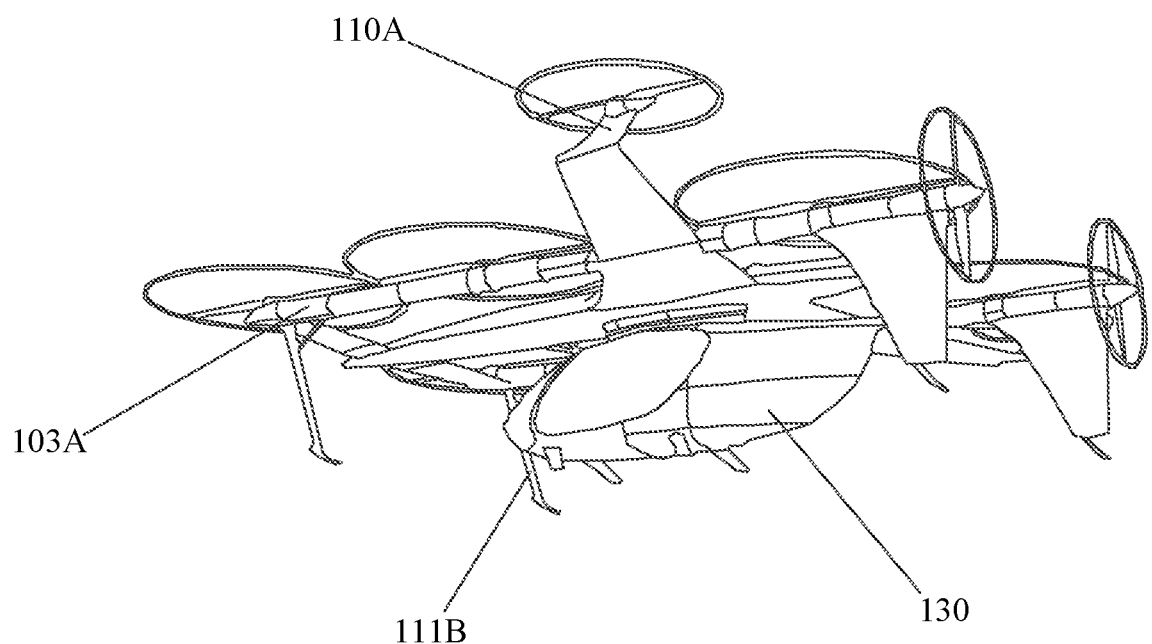
FIG. 9 is a rear perspective view of the unmanned aircraft system of FIG. 7 in accordance with one aspect of the embodiment.
Figure 10:
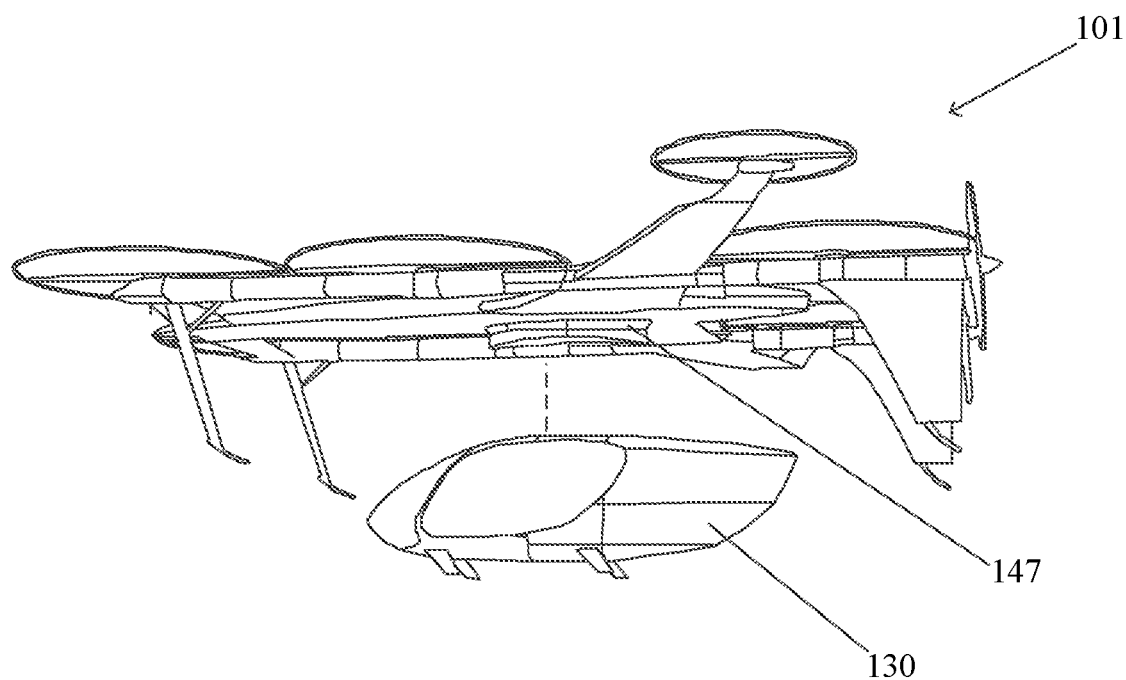
FIG. 10 is a side perspective view of the unmanned aircraft system of FIG. 7 in accordance with one aspect of the embodiment, wherein the passenger pod is detached from the flight platform and parked on the ground.
Figure 11:
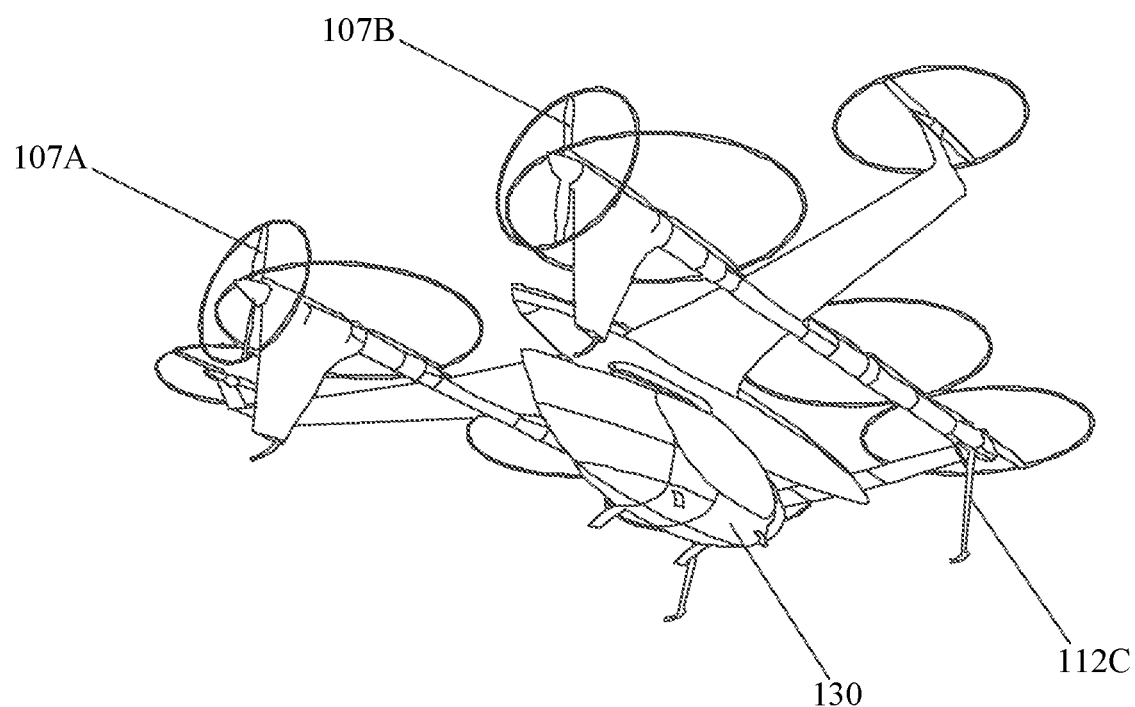
FIG. 11 is a rear perspective view of the embodiment of FIG. 7 in accordance with one aspect of the embodiment.
Figure 12:
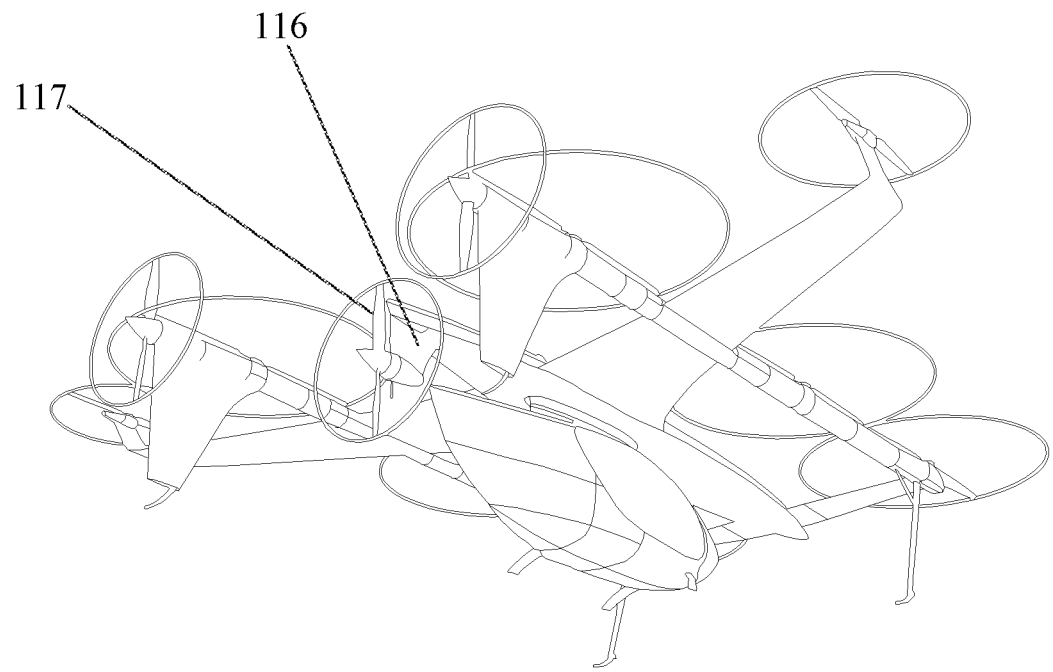
FIG. 12 is a rear perspective view of another embodiment in accordance with one aspect of the disclosure.
Figure 13:
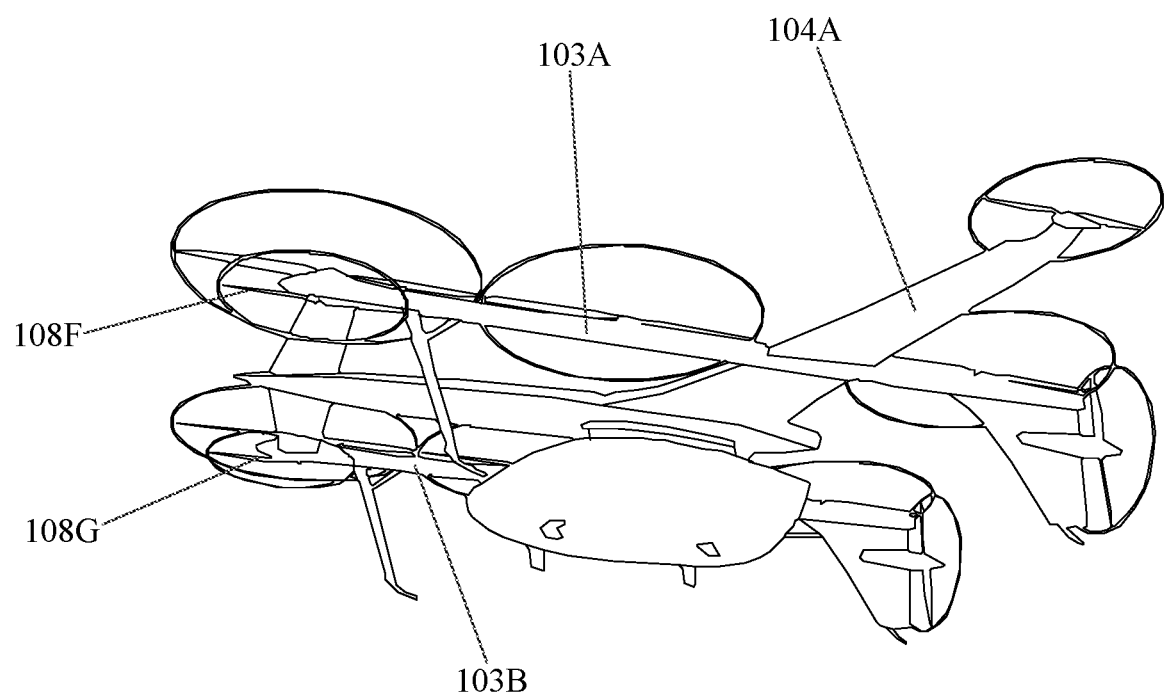
FIG. 13 is a side bottom perspective view of still another embodiment of an unmanned aircraft system in accordance with one aspect of the embodiment.
Figure 14:
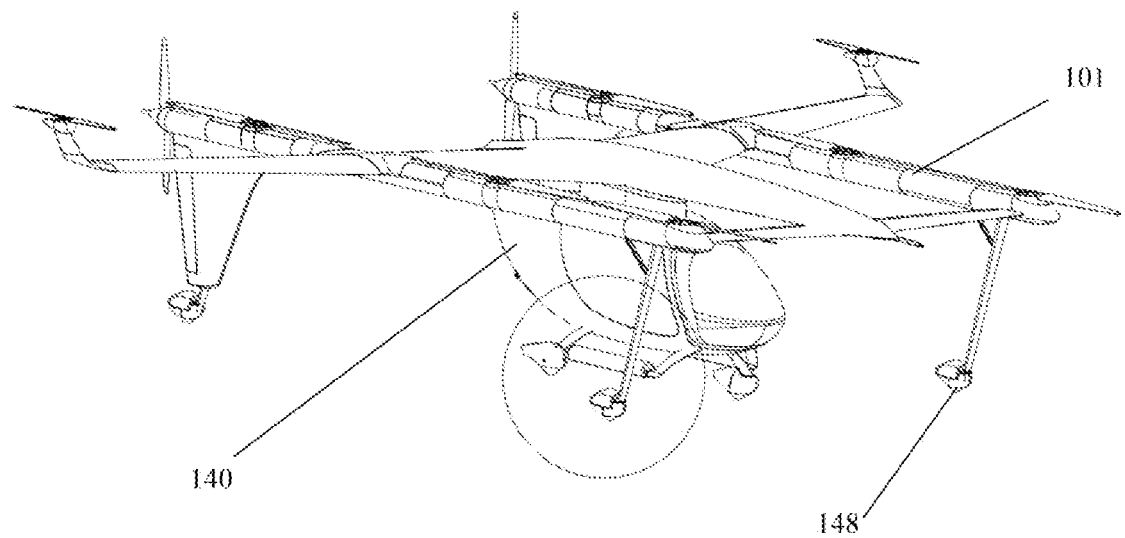
FIG. 14 is a perspective view of one embodiment of an unmanned aircraft system in accordance with another aspect of the embodiment.
Figure 15:
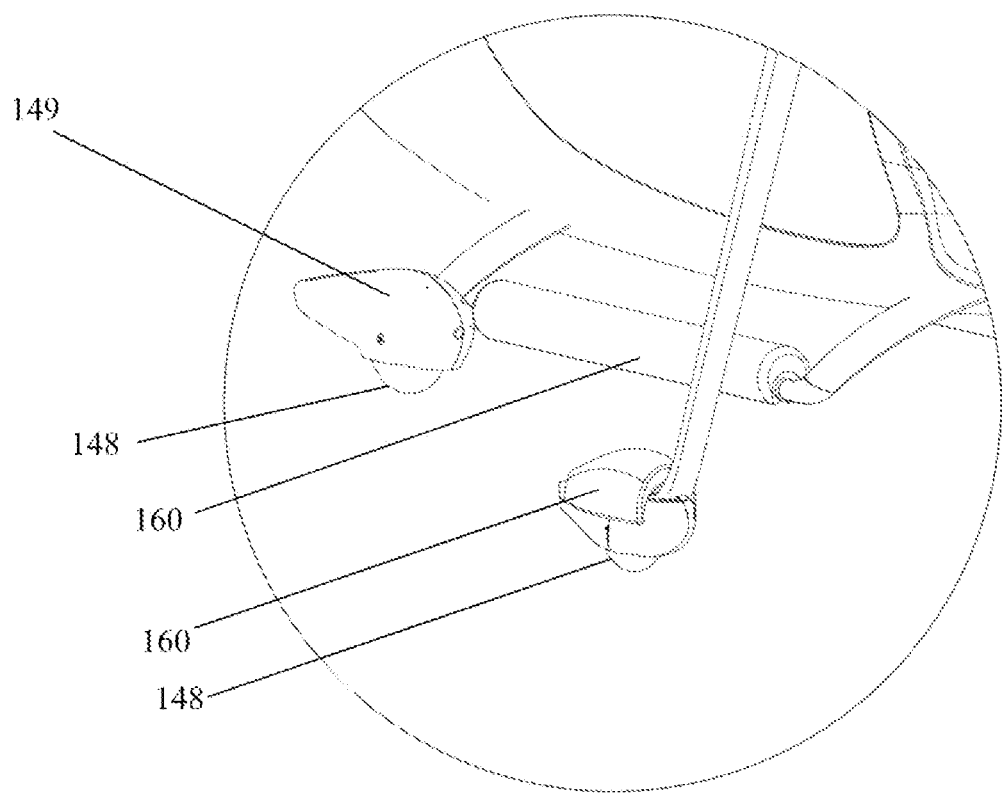
FIG. 15 is a close-up view of an encircled region in FIG. 14 in accordance with another aspect of the embodiment.
Figure 16:
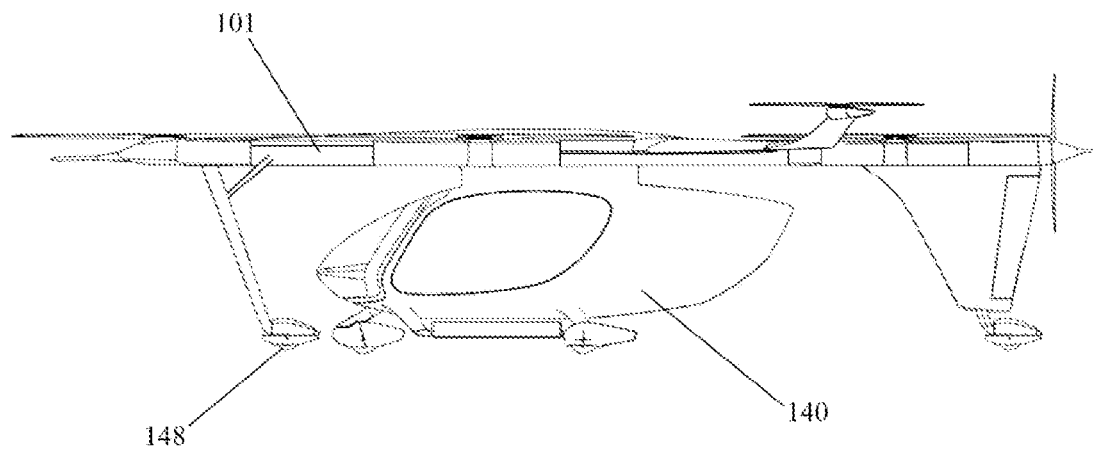
FIG. 16 is a side view of one embodiment of an unmanned aircraft system in accordance with another aspect of the embodiment.
Figure 17:
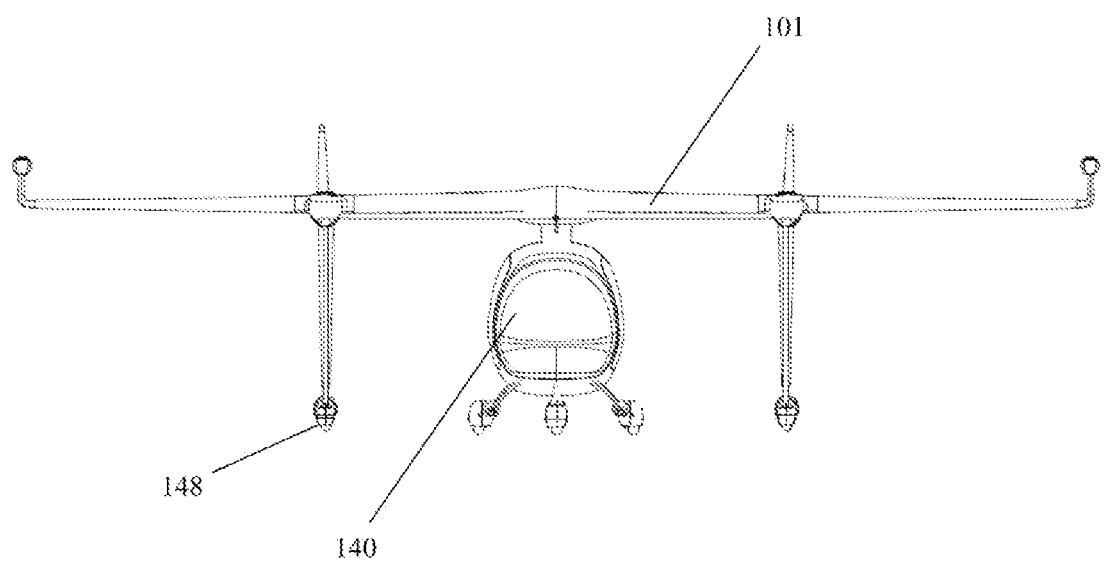
FIG. 17 is a front view of one embodiment of an unmanned aircraft system in accordance with another aspect of the embodiment.
Figure 18:
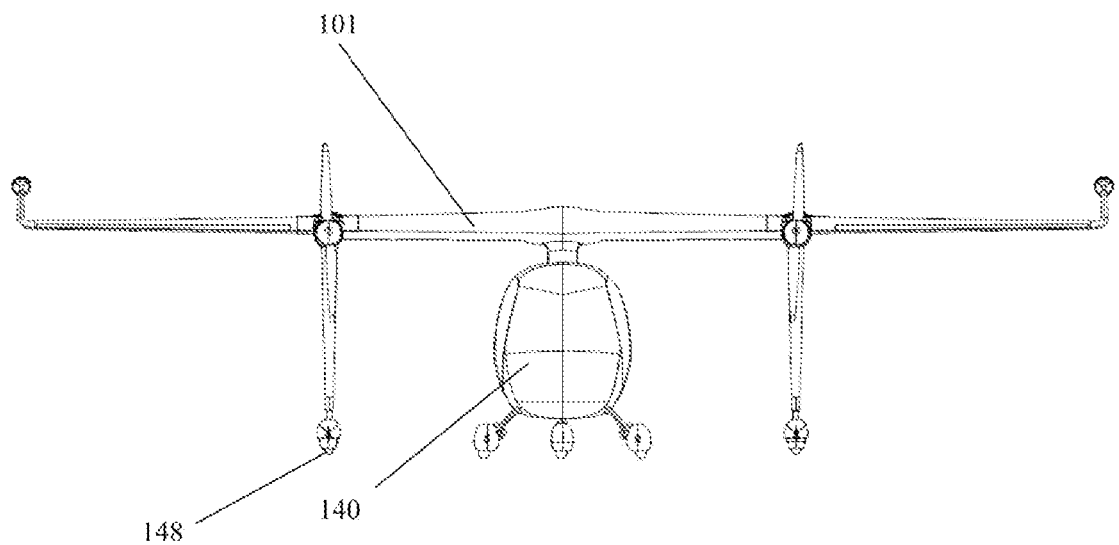
FIG. 18 is a rear view of one embodiment of an unmanned aircraft system in accordance with another aspect of the embodiment.
Figure 19:
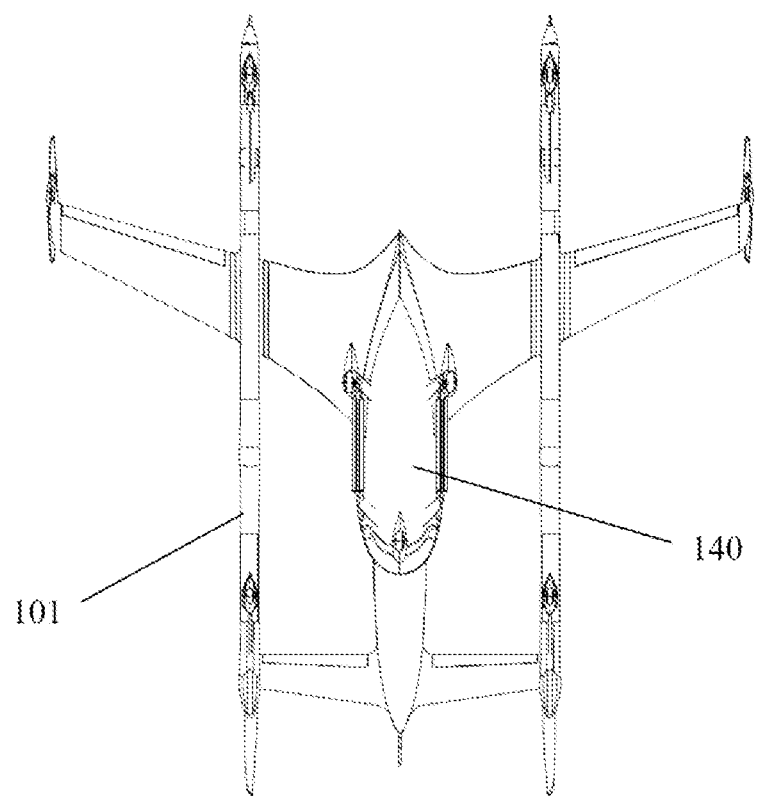
FIG. 19 is an upward view of one embodiment of an unmanned aircraft system in accordance with another aspect of the embodiment.
Figure 20:
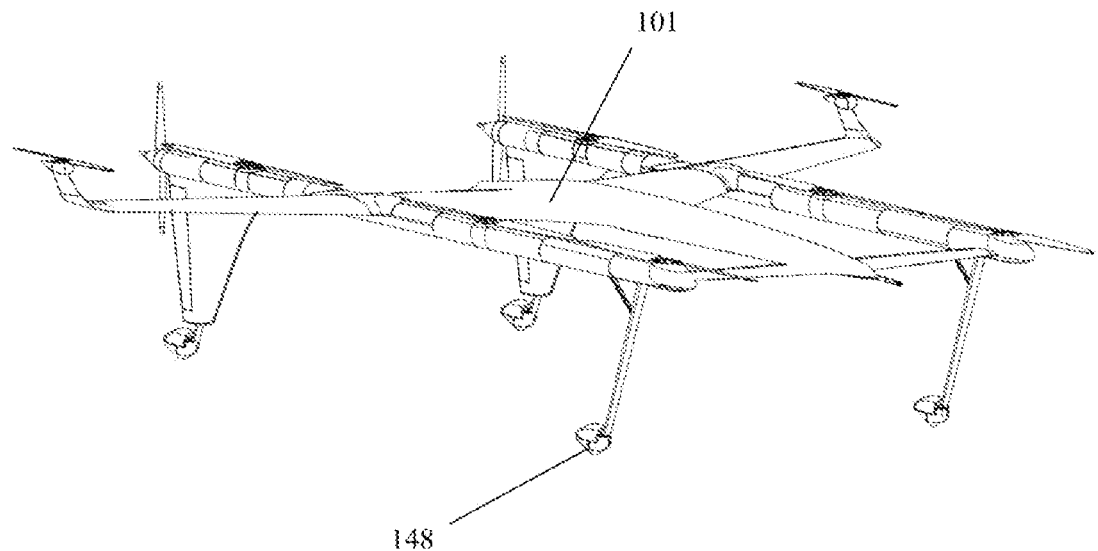
FIG. 20 is a perspective view of another embodiment of a flight platform in accordance with another aspect of the embodiment.
Figure 21:
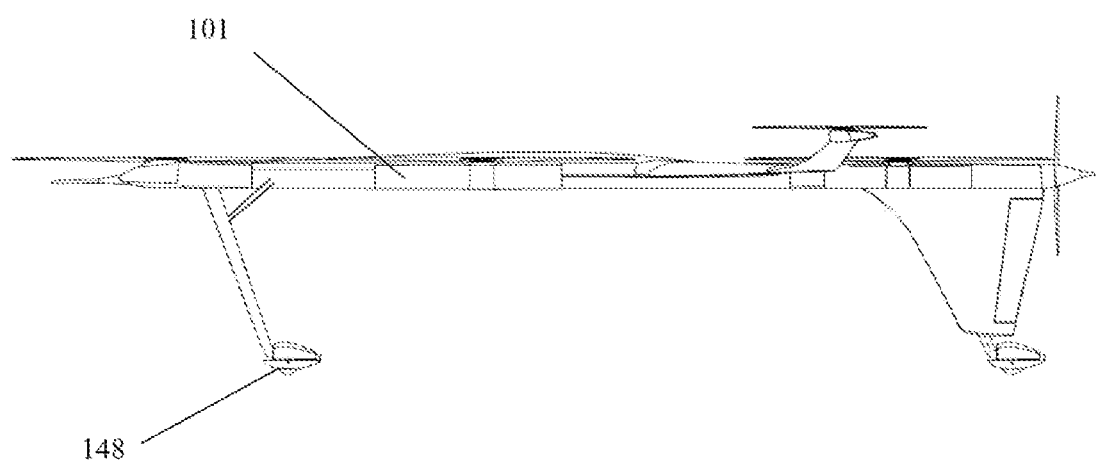
FIG. 21 is a side view of another embodiment of a flight platform in accordance with another aspect of the embodiment.
Figure 22:
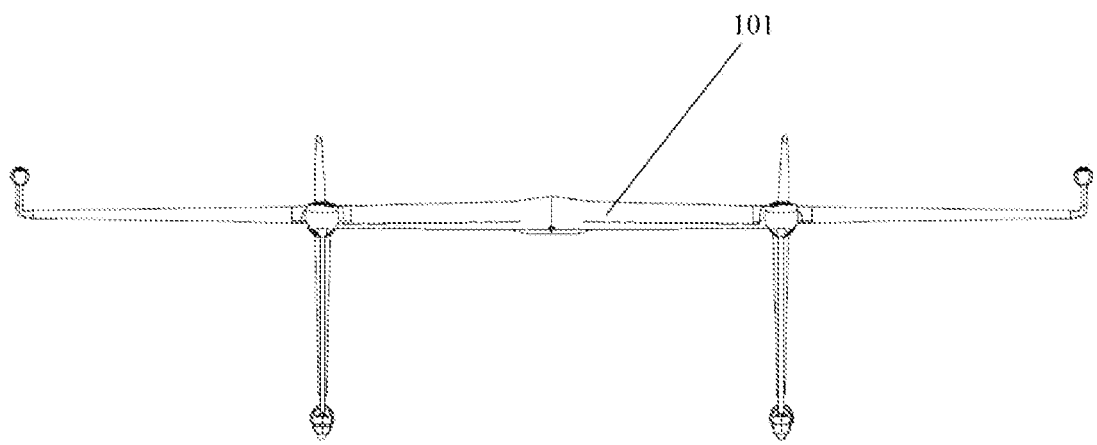
FIG. 22 is a front view of another embodiment of a flight platform in accordance with another aspect of the embodiment.
Figure 23:
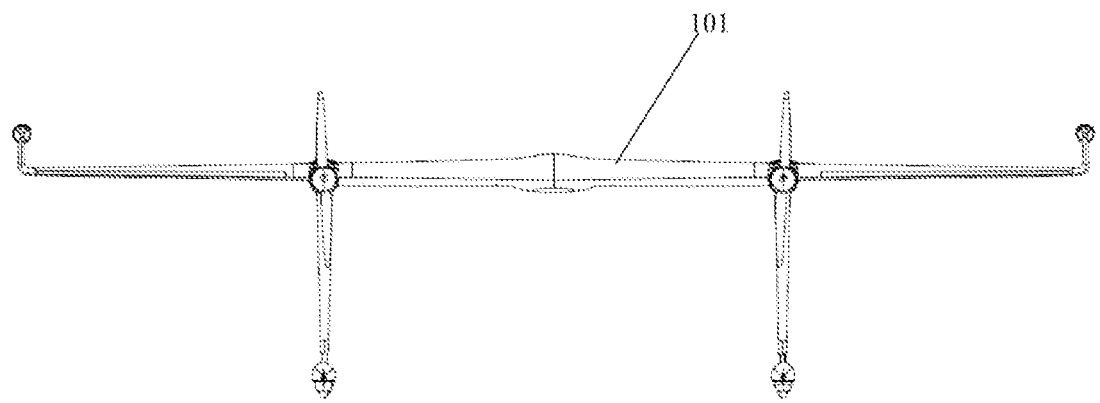
FIG. 23 is a rear view of another embodiment of a flight platform in accordance with another aspect of the embodiment.
Figure 24:
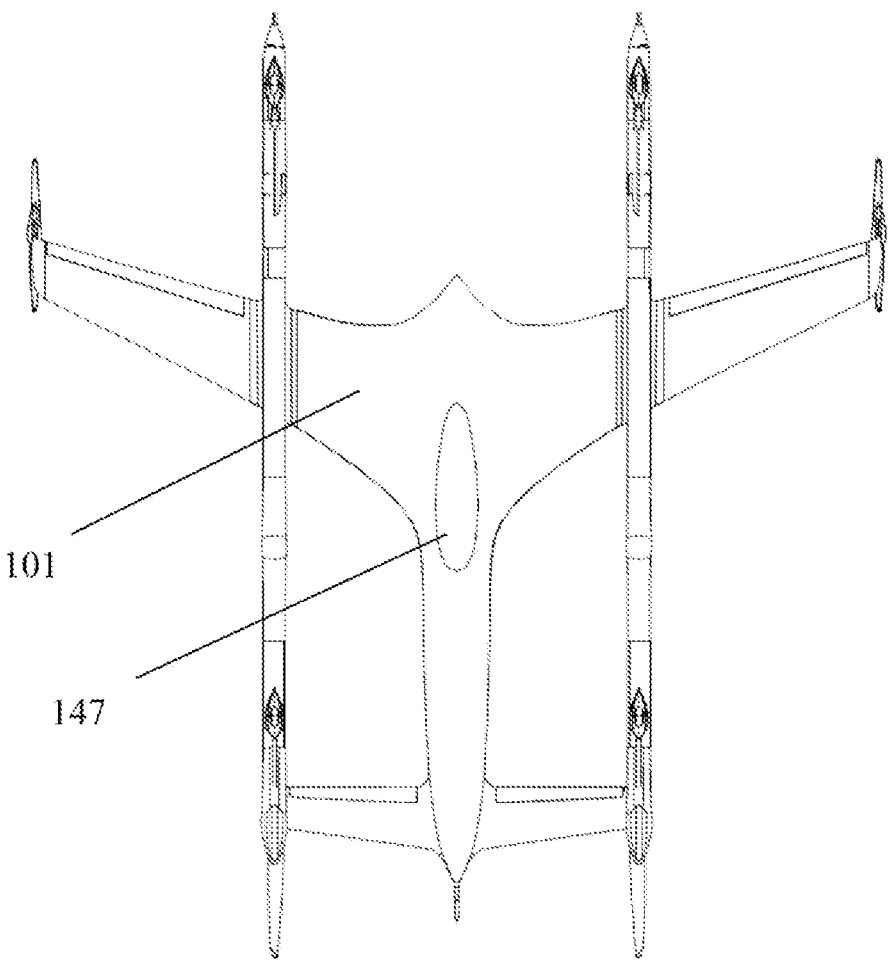
FIG. 24 is an upward view of another embodiment of a flight platform in accordance with another aspect of the embodiment.
Figure 25:
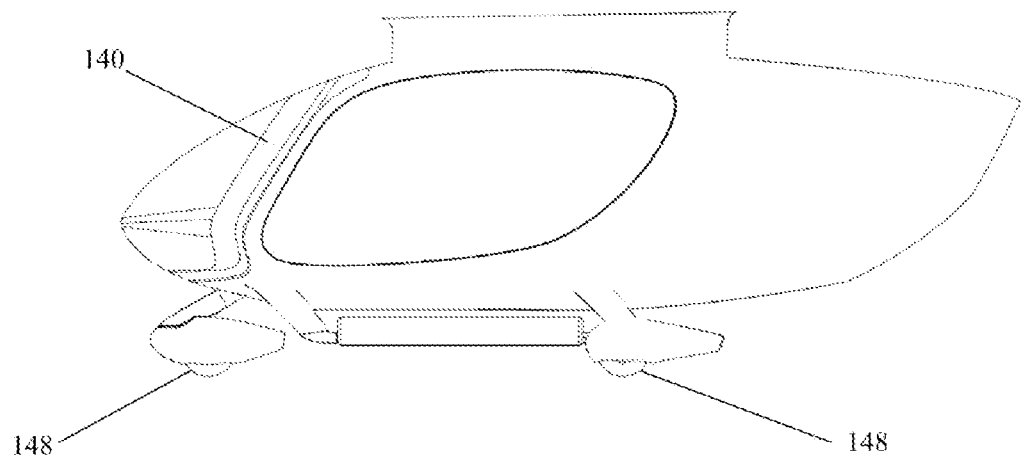
FIG. 25 is a side view of another embodiment of a passenger pod in accordance with another aspect of the embodiment.
Figure 26:
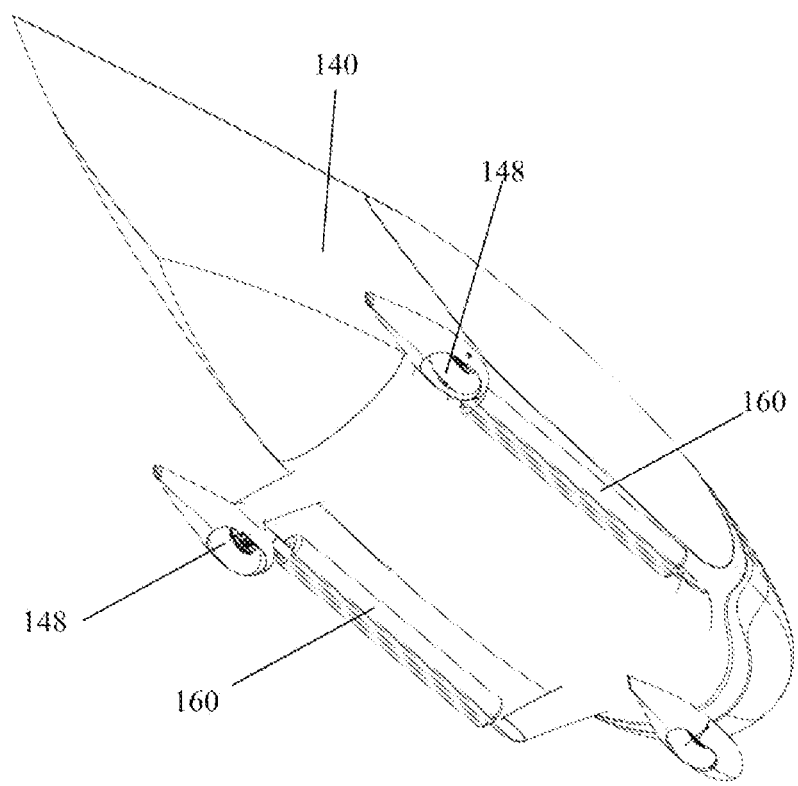
FIG. 26 is a bottom perspective view of another embodiment of a passenger pod in accordance with another aspect of the embodiment.
Figure 27:
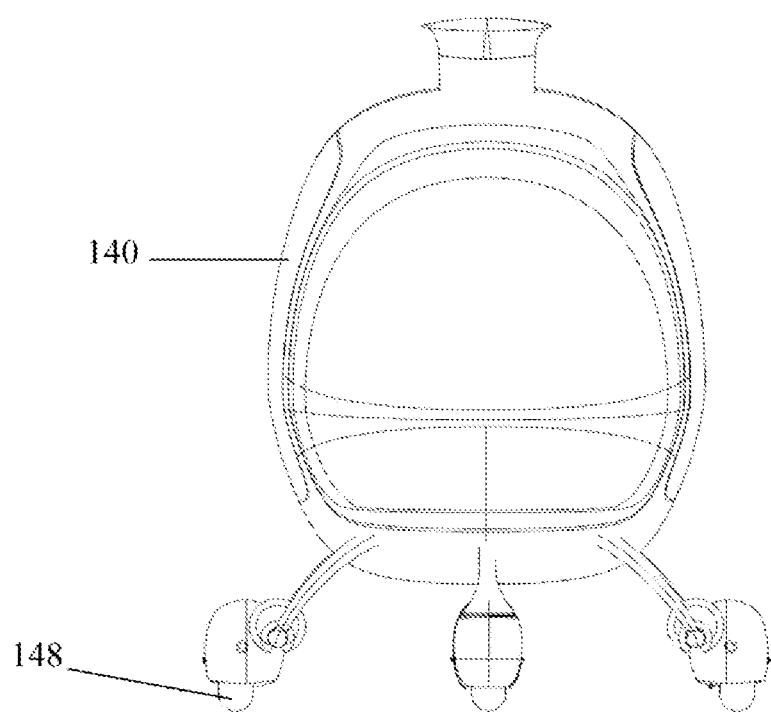
FIG. 27 is a front view of another embodiment of a passenger pod in accordance with another aspect of the embodiment.
Figure 28:
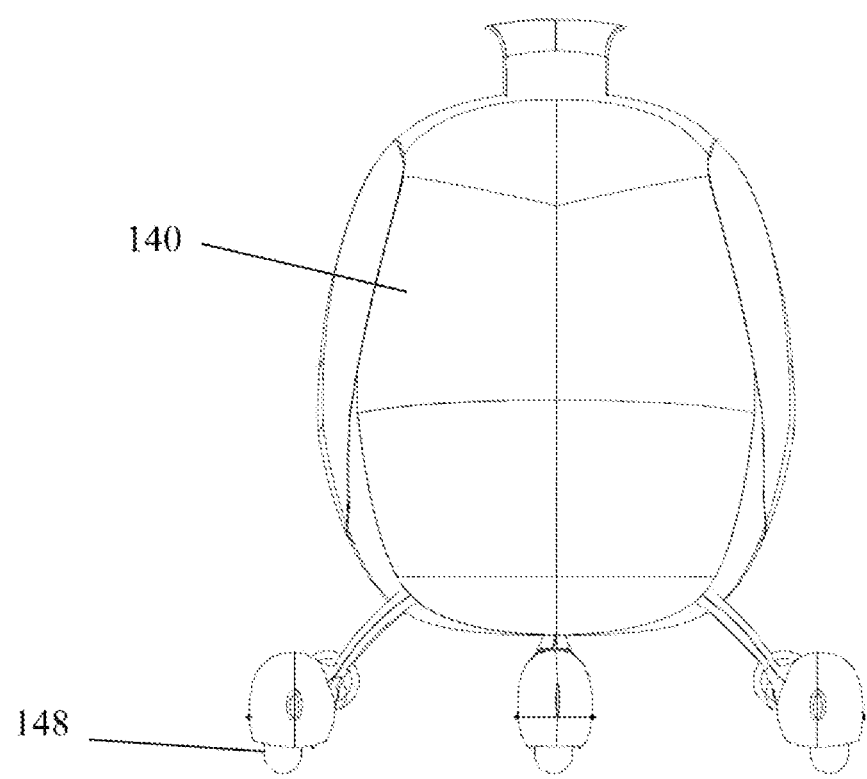
FIG. 28 is a rear view of another embodiment of a passenger pod in accordance with another aspect of the embodiment.
Figure 29:
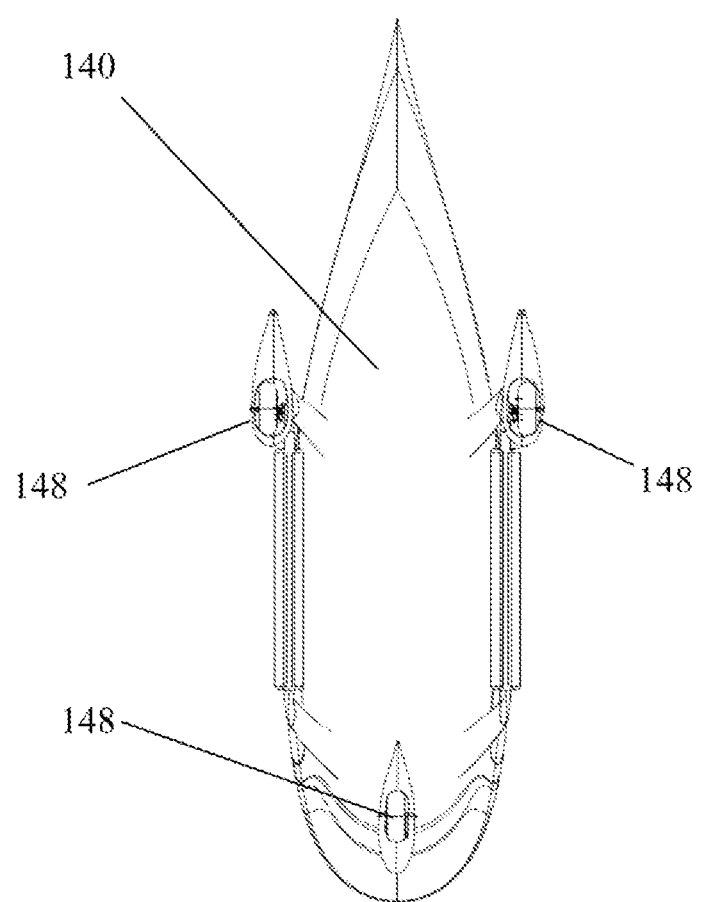
FIG. 29 is an upward view of another embodiment of a passenger pod in accordance with another aspect of the embodiment.
Figure 30:
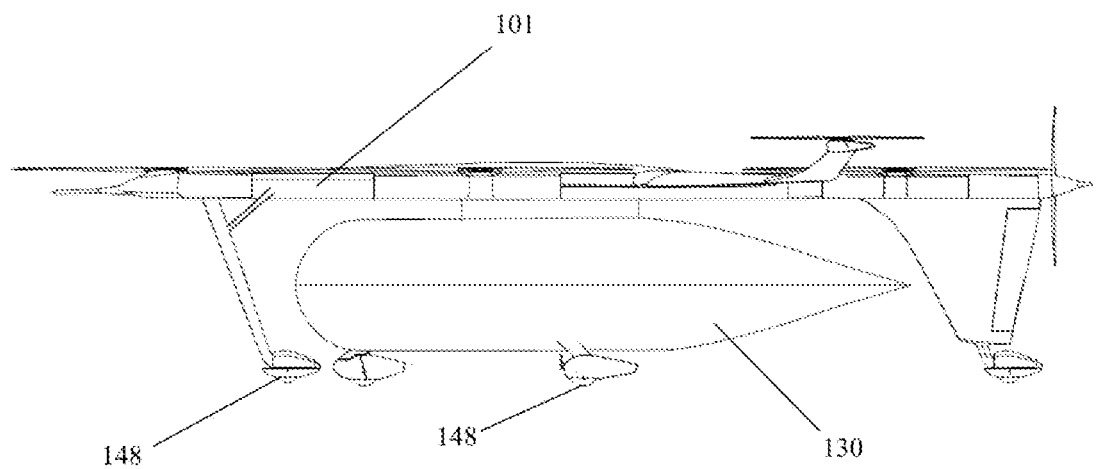
FIG. 30 is a side view of another embodiment of a flight platform attached to a cargo pod in accordance with another aspect of the embodiment.
Figure 31:
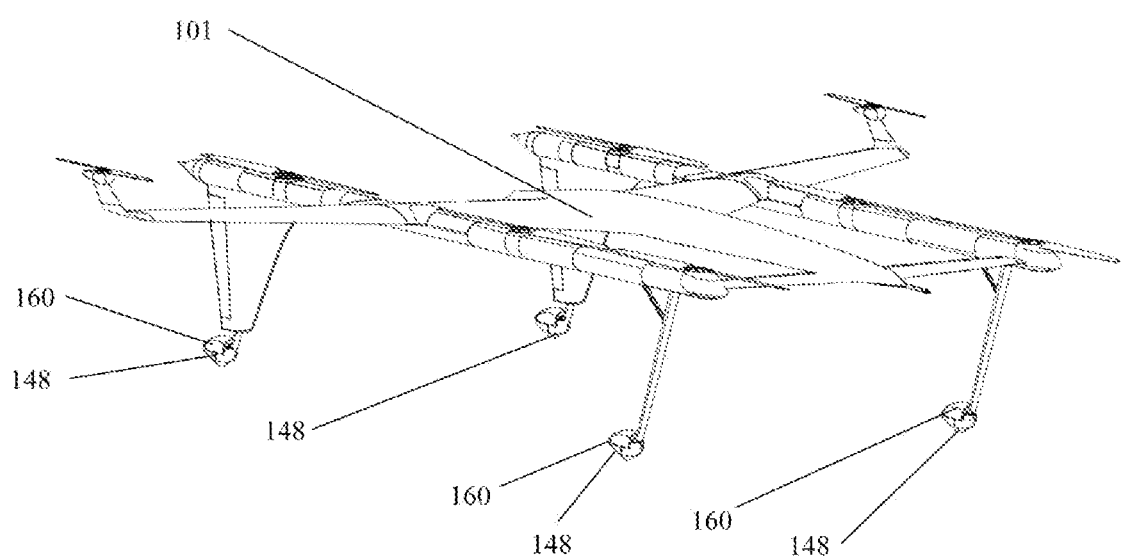
FIG. 31 is a perspective view of another embodiment of a flight platform without a propulsion propeller in accordance with another aspect of the embodiment.
Figure 32:
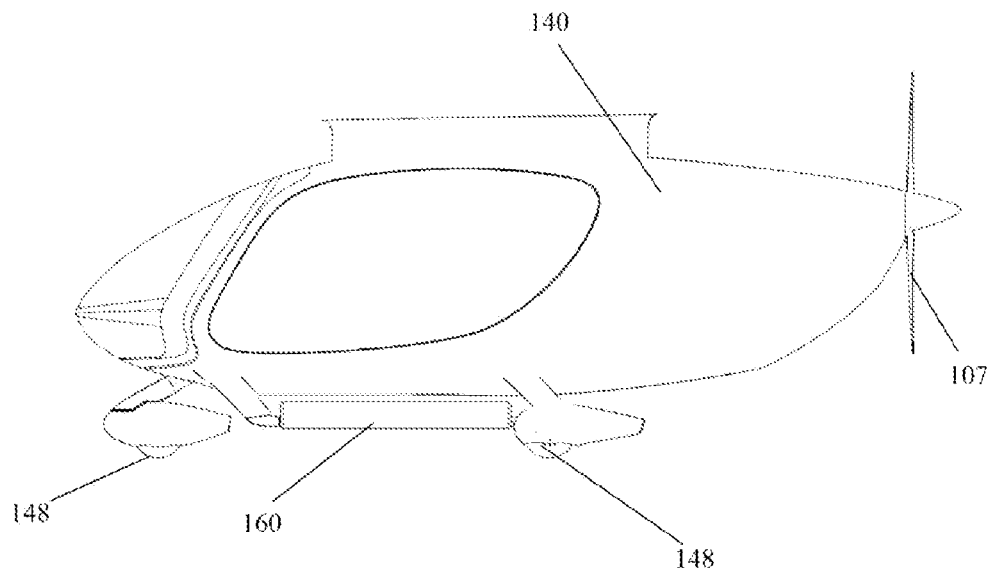
FIG. 32 is a side view of another embodiment of a passenger pod with a propulsion propeller in accordance with another aspect of the embodiment.
Figure 33:
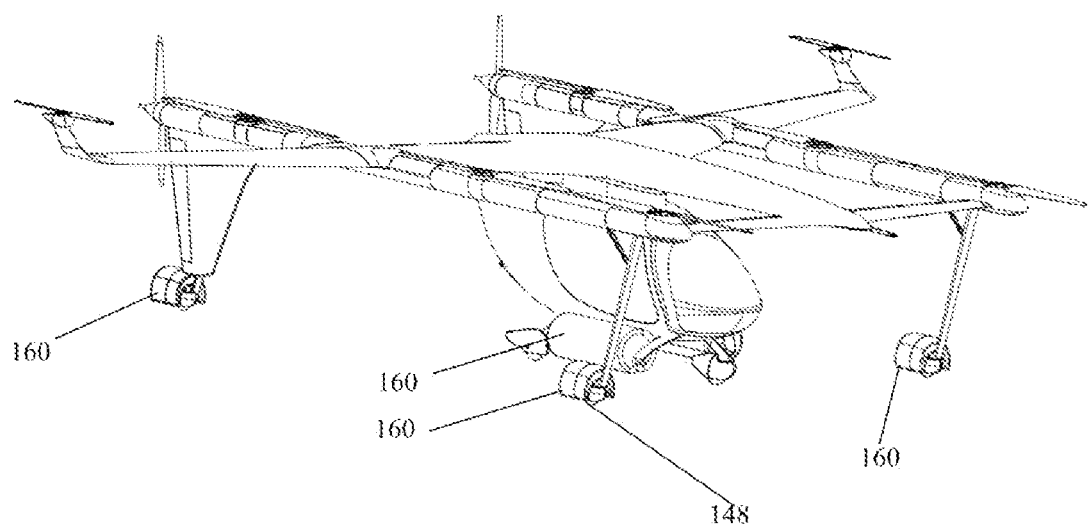
FIG. 33 is a perspective view of still another embodiment of a flight unmanned aircraft system, wherein six flotation devices are inflated.
Figure 34:
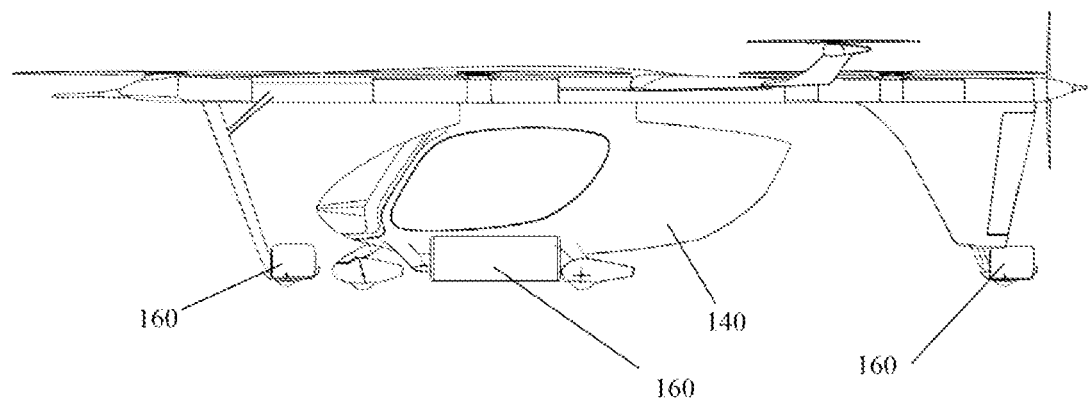
FIG. 34 is a side view of the flight unmanned aerial vehicle of FIG. 33
Figure 35:
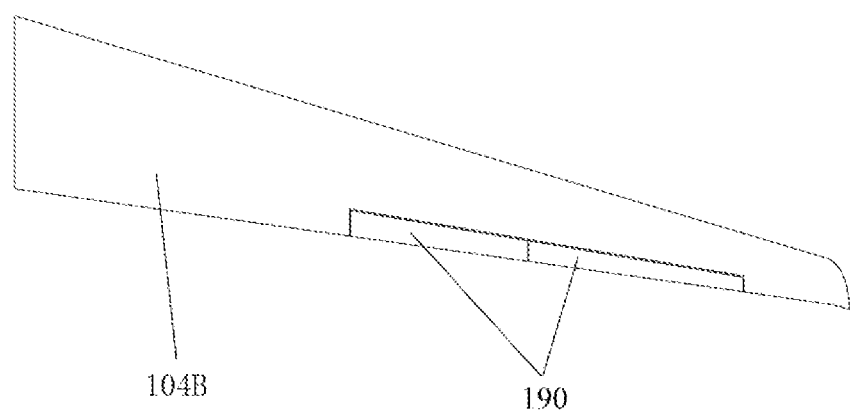
FIG. 35 is a view illustrating a configuration of ailerons of an unmanned aerial vehicle.

FIG. 1a is a top perspective view of an embodiment of a VTOL unmanned aircraft system in accordance with one aspect of an embodiment; FIG. 1b is a top perspective view of an embodiment of a VTOL unmanned aircraft system in accordance with still another aspect of an embodiment; FIG. 2 is a top rear perspective view of the unmanned aircraft system of FIG. 1b; FIG. 3 is a side view of the unmanned aircraft system of FIG. 1b; FIG. 4 is a top perspective view of another embodiment of a VTOL unmanned aircraft system with a flight platform and a detachably attached pod in accordance with one aspect of the embodiment; FIG. 5 is a top view of the unmanned aircraft system of FIG. 4 in accordance with one aspect of the embodiment; FIG. 6 is a front view of the unmanned aircraft system of FIG. 4 in accordance with one aspect of the embodiment; FIG. 7 is a top perspective view of an embodiment of a VTOL unmanned aircraft system with a flight platform and a detachably attached passenger pod in accordance with one aspect of the embodiment; FIG. 8 is a front view of the unmanned aircraft system of FIG. 7 in accordance with one aspect of the embodiment; FIG. 9 is a rear perspective view of the unmanned aircraft system of FIG. 7 in accordance with one aspect of the embodiment; FIG. 10 is a side perspective view of the unmanned aircraft system of FIG. 7 in accordance with one aspect of the embodiment, wherein the passenger pod is detached from the flight platform and parked on the ground; FIG. 11 is a rear perspective view of the embodiment of FIG. 7 in accordance with one aspect of the embodiment; FIG. 12 is a rear perspective view of another embodiment in accordance with one aspect of the disclosure; FIG. 13 is a side bottom perspective view of still another embodiment of an unmanned aircraft system in accordance with one aspect of the embodiment; FIG. 14 is a perspective view of one embodiment of an unmanned aircraft system in accordance with another aspect of the embodiment; FIG. 15 is a close-up view of an encircled region in FIG. 14 in accordance with another aspect of the embodiment; FIG. 16 is a side view of one embodiment of an unmanned aircraft system in accordance with another aspect of the embodiment; FIG. 17 is a front view of one embodiment of an unmanned aircraft system in accordance with another aspect of the embodiment; FIG. 18 is a rear view of one embodiment of an unmanned aircraft system in accordance with another aspect of the embodiment; FIG. 19 is an upward view of one embodiment of an unmanned aircraft system in accordance with another aspect of the embodiment; FIG. 20 is a perspective view of another embodiment of a flight platform in accordance with another aspect of the embodiment; FIG. 21 is a side view of another embodiment of a flight platform in accordance with another aspect of the embodiment; FIG. 22 is a front view of another embodiment of a flight platform in accordance with another aspect of the embodiment; FIG. 23 is a rear view of another embodiment of a flight platform in accordance with another aspect of the embodiment; FIG. 24 is an upward view of another embodiment of a flight platform in accordance with another aspect of the embodiment; FIG. 25 is a side view of another embodiment of a passenger pod in accordance with another aspect of the embodiment; FIG. 26 is a bottom perspective view of another embodiment of a passenger pod in accordance with another aspect of the embodiment; FIG. 27 is a front view of another embodiment of a passenger pod in accordance with another aspect of the embodiment; FIG. 28 is a rear view of another embodiment of a passenger pod in accordance with another aspect of the embodiment; FIG. 29 is an upward view of another embodiment of a passenger pod in accordance with another aspect of the embodiment; FIG. 30 is a side view of another embodiment of a flight platform attached to a cargo pod in accordance with another aspect of the embodiment; FIG. 31 is a perspective view of another embodiment of a flight platform without a propulsion propeller in accordance with another aspect of the embodiment; FIG. 32 is a side view of another embodiment of a passenger pod with a propulsion propeller in accordance with another aspect of the embodiment; FIG. 33 is a perspective view of still another embodiment of a flight unmanned aircraft system, wherein six flotation devices are inflated; FIG. 34 is a side view of the flight unmanned aerial vehicle of FIG. 33 FIG. 35 is a view illustrating a configuration of ailerons of an unmanned aerial vehicle.

FIG. 1a depicts an embodiment of a VTOL unmanned aerial vehicle 100 with a front wing configuration in general. The unmanned aerial vehicle 100 at least comprises: a left main ring 104A and a right main wing 104B; and a main body 102 which is engaged with the left main wing 104A and the right main wing 104B, specifically, the left main wing 104A and the right main wing 104B are respectively located at the left side and the right side of the main body 102 and engaged with the main body 102, and positions of the left main wing 104A and the right main wing 104B are opposite in relative to the main body 102 at the moment. It may be understood by those skilled in the art that the main wings are the wings with the largest horizontal sections on the two sides of the unmanned aerial vehicle 100, and the unmanned aerial vehicle 100 may generate lift in the flight process, and thus the unmanned aerial vehicle 100 may fly stably in the air.

FIG. 1b shows that the unmanned aerial vehicle 100 further comprises a left front wing 105A and a right front wing 105B, and the left front wing 105A and the right front wing 105B are respectively located on the left side and the right side of the main body 102 and engaged with the main body 102. The embodiment is not intended to limit the size of a spacing between the front wing and the main wing, and the spacing may be set by those skilled in the art according to actual needs. It may be understood by those skilled in the art that the front wings are used for controlling a flight attitude of the unmanned aerial vehicle, i.e., the pitch of the unmanned aerial vehicle.

FIG. 1a shows that the unmanned aerial vehicle 100 is provided with a left linear support 103A and a right linear support 103B, the left linear support 103A is engaged with the left main wing 104A, and the right linear support 103B is engaged with the right main wing 104B. A plurality of lift propellers 108A, 108B, 108C are arranged on the top side of the left linear support 103A, and a plurality of lift propellers 108D, 108E, 108F are arranged on the top side of the right linear support 103B; illustratively, the plurality of lift propellers are arranged on the linear supports and fixedly connected with the linear supports. It is easy to understand that the number of the lift propeller is not limited, and the number of the lift propeller may be set by those skilled in the art according to actual needs. It may be understood by those skilled in the art that the linear supports may be used for accommodating other components and parts of the unmanned aerial vehicle 100, such as a motor for driving the lift propellers to rotate, thereby making a structure of the main body 102 of the unmanned aerial vehicle 100 more compact. Upward lift may be exerted on the linear supports through the rotation of the lift propellers, and thus the unmanned aerial vehicle 100 is driven to rise, and the takeoff and landing speed of the unmanned aerial vehicle 100 may be controlled by controlling rotating speeds of the lift propellers.

As shown in FIG. 1a, the left additional lift propeller 181A is arranged on the bottom side of the left linear support 103A, and a right additional lift propeller 181B is arranged on the bottom side of the right linear support 103B.

By adopting the unmanned aerial vehicle provided by the disclosure, the takeoff and landing power of the unmanned aerial vehicle is effectively improved and the maximum take-off weight and effective load of the unmanned aerial vehicle are improved by using multiple groups of lift motors on the unmanned aerial vehicle.

FIG. 1b depicts an embodiment of a VTOL unmanned aerial vehicle 100 with a front wing configuration in general.

The unmanned aerial vehicles shown in FIG. 1a and FIG. 1b have partially identical structural configuration. The various part features of the unmanned aerial vehicle in the various embodiments shown in the accompanying drawings, which are illustrative only, may be flexibly combined to form a new unmanned aerial vehicle design.

In FIG. 1b, the unmanned aerial vehicle 100 may have two main wings 104A, 104B as a left main wing and a right main wing, and two front wings as a left front wing 105A and a right front wing 105B. The two main wings 104A, 104B and the two front wings 105A, 105B may be attached to a main body 102, wherein the main body may be positioned along a central longitudinal line of the unmanned aerial vehicle 100. The unmanned aerial vehicle 100 may also have a left linear support 103A arranged parallel to the main body 102, which may connect the left main wing 104A to the left front wing 105A. Similarly, the unmanned aerial vehicle 100 may also have a right linear support 103B arranged parallel to the main body 102, which may connect the right main wing 104B to the right front wing 105B. Wherein the front wings of the unmanned aerial vehicle mainly control a flight attitude of the unmanned aerial vehicle during the flight period, such as controlling the pitch of the unmanned aerial vehicle. The main wings of the unmanned aerial vehicle, acting as the largest wings at the two sides of a fuselage, are usually used for generating lift to support the unmanned aerial vehicle to fly in the air, and meanwhile, certain stabilization and manipulation effects are achieved.

In still another embodiment, the unmanned aerial vehicle 100 may also not have the front wing configuration. Illustratively, the unmanned aerial vehicle 100 may have two main wings as a left main wing and a right main wing, and two ailerons as a left aileron and a right aileron, all of which are engaged together to form a flight platform. In the following description, the description of the front wing and the aileron is not distinguished unless specifically stated.

In one embodiment, as shown in FIG. 35, the aileron 190 of the unmanned aerial vehicle may be arranged at the rear side of the main wing 104B, there may be at least one aileron, preferably two, which is in a sheet-like configuration, and capable of moving up and down to control the roll of the unmanned aerial vehicle.

The left linear support 103A and the right linear support 103B are expected to improve the structural integrity of the unmanned aerial vehicle 100. In other embodiments, the left linear support 103A and the right linear support 103B may accommodate a driving motor (not shown) for driving each of the lift propellers 108A, 108B, 108C, 108D, 108E, and 108F. Thus, the left linear support 103A and the right linear support 103B may be used for fixing the lift propellers to reduce usage of the parts of the unmanned aerial vehicle, and while simplifying structural parts of the unmanned aerial vehicle, the overall strength of the unmanned aerial vehicle may be improved due to the engagement of the left linear support 103A and the right linear support 103B with the two front wings and the two main wings. As will be disclosed later, the left linear support 103A and the right linear support 103B may also accommodate folding legs 111, each of which may be retracted into the left linear support 103A and the right linear support 103B.

In one embodiment, the left linear support 103A and the right linear support 103B are attached to the distal ends of the left front wing 105A and the right front wing 105B respectively. In still another embodiment, the left linear support 103A and the right linear support 103B extend beyond the front wings 105A, 105B.

In one embodiment, the left linear support 103A and the right linear support 103B are attached to positions near the middle portions of the left main wing 104A and the right main wing 104B respectively. In still another embodiment, the left linear support 103A and the right linear support 103B extend beyond the main wings 104A, 104B along a backwards direction.

The left linear support 103A is expected to be relative narrow in diameter, and may have a first group of multiple lift propellers 108A, 108B, 108C arranged at the top side, the bottom side, or both, of the left linear support 103A. In one feasible embodiment, these lift propellers 108A, 108B, 108C may be driven by low profile motors arranged in a hollow interior of the left linear support 103A. In an embodiment shown in FIG. 1b, the lift propellers 108A, 108B, 108C are only arranged on the top side of the left linear support 103A. It should be noted that the number of the lift propeller shown in the figure is for illustrative purpose only, the disclosure is not intended to limit the number of the lift propeller, and the lift propeller may be increased or decreased according to the demand in actual. Likewise, the right linear support 103B is expected to be relative narrow in diameter, and may have a second group of multiple lift propellers 108D, 108E, and 108F arranged on the top side, the bottom side, or both, of the right linear support 103B. In one feasible embodiment, these lift propellers 108D, 108E, 108F may be driven by low profile motors arranged in a hollow interior of the right linear support. In an embodiment shown in FIG. 1b, the lift propellers 108D, 108E, 108F are only arranged at the top side of the right linear support 103B. It should be noted that the number of the lift propeller shown in the figure is for illustrative purpose only, the disclosure is not intended to limit the number of the lift propeller, and the lift propeller may be increased or decreased according to the demand in actual.

In one embodiment, referring to FIG. 1a, a left additional lift propeller 181A is arranged on the bottom side of the left linear support 103A, and a right additional lift propeller 181B is arranged on the bottom side of the right linear support 103B.

In one embodiment, a rotation coverage area of the left additional lift propeller 181A overlaps with rotation coverage areas of two lift propellers in the first group of multiple lift propellers 108A, 108B, 108C. Such arrangement is in favor of improving the lift.

In one embodiment, the rotation coverage area of the left additional lift propeller 181B overlaps with rotation coverage areas of the first two lift propellers 108A, 108B in the first group of multiple lift propellers 108A, 108B, 108C, which is as shown in FIG. 1a, but is not limited thereto. Such arrangement is in favor of improving the rotor lift.

In one embodiment, the unmanned aerial vehicle further comprises a left vertical stabilizer 106A which is arranged at a position close to the tail end of the left linear support 103A, and a right vertical stabilizer 106B which is arranged at a position close to the tail end of the right linear support 103B. The left vertical stabilizer and the right vertical stabilizer are used for maintaining stability of the unmanned aerial vehicle during the flight.

In one embodiment, the unmanned aerial vehicle 100 further comprises top end lift propellers 170A, 170B which are respectively arranged at the top ends of the left vertical stabilizer 106A and the right vertical stabilizer 106B. The top end lift propellers are used for improving the rotor lift and improving the maximum task load ability.

In one embodiment, as shown in FIG. 1b, the unmanned aerial vehicle 100 further comprises two wingtip propellers, and the two wingtip propellers are respectively arranged at end parts, away from the main body 102, of the left main wing 104A and the right main wing 104B. It should be noted that, in addition to increasing the lift of the unmanned aerial vehicle 100, the wingtip propellers may achieve the roll of the unmanned aerial vehicle 100 by controlling different rotating speeds of the wingtip propellers on the left side and the right side of the main body 102.

Illustratively, one end, away from the main body 102, of each of the left main wing 104A and the right main wing 104B is provided with a wingtip vertical stabilizer, the wingtip vertical stabilizer is a plate-shaped structure which is vertically arranged and parallel to the longitudinal axis of the main body 102, and the wingtip vertical stabilizer is located above the main wing and fixedly connected with the main wing. The wingtip propeller is arranged at the top end of the wingtip vertical stabilizer. It may be understood by those skilled in the art that the wingtip vertical stabilizer may also play a role of a stabilizer to increase the stability of the unmanned aerial vehicle 100 during the flight; and meanwhile, the wingtip propeller is arranged at the top end of the wingtip vertical stabilizer, and thus a plane of rotation of the wingtip propeller is higher than the main wing, and interference between the wingtip propeller and the main wing is avoided.

In one embodiment, the unmanned aerial vehicle 100 further comprises a traction propeller 180 which is arranged at the front end of the main body 102. The traction propeller is used for providing power for level flight, and the unmanned aerial vehicle changes the corresponding lift by changing a flight attitude, a flight speed, and airfoil profiles.

In one embodiment, the unmanned aerial vehicle 100 further comprises a propulsion propeller 107 which is arranged at the rear end of the main body 102. The propulsion propeller is also used for providing the power for level flight, and the unmanned aerial vehicle changes the corresponding lift by changing the flight attitude, the flight speed, and the airfoil profiles.

Two groups of horizontal propulsion motors for driving the traction propeller 180 and the propulsion propeller 107 in the unmanned aerial vehicle 100 are arranged at the front and the rear of the fuselage to provide the power for level flight, and the unmanned aerial vehicle changes the corresponding lift by changing the flight attitude, the flight speed, and the airfoil profiles.

In one embodiment, the main wing and the aileron are in a front wing configuration. The main wing and aileron configuration shown in FIG. 35 may be an extended flat plate configuration of the front wing shown in the accompanying drawings.

In one embodiment, the left main wing is connected to the left aileron through the left linear support, and the right main wing is connected to the right aileron through the right linear support. The overall strength of the unmanned aerial vehicle may be improved by engaging the left linear support and the right linear support with the left main wing and the right main wing and the left front wing and the right front wing.

In one embodiment, the unmanned aerial vehicle further comprises a pod which is attached to the bottom side of the main body. By means of the arrangement mode as above, a structure of the unmanned aerial vehicle may be flexibly adjusted; in accordance with the actual conditions, the pod may be installed when needed, and may be detached when not needed, and therefore the unmanned aerial vehicle may be flexibly used in response to different requirements, and the adaptability of the unmanned aerial vehicle is improved.

In one embodiment, the pod is a passenger pod which may be used to transport passengers.

In one embodiment, the pod is a cargo pod which may be used to transport various goods and materials.

In one embodiment, the ratio of the weight increase percentage of the left additional lift propeller and the right additional lift propeller to the increase percentage of takeoff and landing power is 5-15%: 18-35%.

In one embodiment, the ratio of the weight increase percentage of the left additional lift propeller and the right additional lift propeller to the lift increase percentage is 5-10%: 18-30%.

In one embodiment, the ratio of the weight increase percentage of the left additional lift propeller and the right additional lift propeller to the lift increase percentage is 6%: 20-25%.

In one embodiment, the ratio of the weight increase percentage of the left additional lift propeller and the right additional lift propeller to the lift increase percentage is 6%: 22%.

In conclusion, the weight increase of the left additional lift propeller and right additional lift propeller is less than the lift increase of the unmanned aerial vehicle, and thus the maximum rotor lift of the unmanned aerial vehicle is improved under the condition that the bare weight of the fuse is increased, and the maximum task load capacity is obviously improved.

By utilizing a high thrust-to-weight ratio integrated electronic speed controller motor provided by the disclosure, the lift capable of being provided by each added lift motor assembly is much greater than the increased weight, and on this basis, an effective task load of a large load (such as 500 kilograms) in a vertical takeoff and landing unmanned aerial vehicle may be remarkably improved, and in a preferred embodiment, the unmanned aerial vehicle comprises 10 groups of lift motors for takeoff and landing flight and hovering. Two groups of electric propulsion motors are located at a nose and a tail of the unmanned aerial vehicle. In ten groups of lift motors, eight groups of lift motors are located on the arms and an upper portion of empennage, and two groups of lift motors are located in the middles of the lower portions of the front arms. Compared with eight lift motors in the prior art, the ten lift motors may improve the maximum rotor lift by 22% under the condition that the size of the fuselage is not increased and only the bare weight of the fuselage is increased by 6%, and the ten lift motors may improve the maximum task load capacity by 60% compared with the eight-lift motor configuration.

As above, multiple groups of lift motors, preferably ten groups of lift motors, are used for the large-load vertical takeoff and landing unmanned aerial to effectively improve the takeoff and landing power of the unmanned aerial vehicle, and the maximum takeoff weight and the effective load of the unmanned aerial vehicle are improved. Further preferably, under the condition that the unmanned aerial vehicle is further provided with multiple groups of propulsion motors, preferably two groups of propulsion motors, the takeoff and landing power of the unmanned aerial vehicle may be further effectively improved, and the maximum takeoff weight and the effective load of the unmanned aerial vehicle are remarkably improved.

The unmanned aerial vehicle 100 may have at least one propulsion propeller 100 to propel the unmanned aerial vehicle 100 in a forward direction. In one embodiment as shown in FIG. 1b, there may be two propulsion propellers 107A, 107B. The two propulsion propellers 107A, 107B may be arranged at the distal ends at the rear portions of the linear supports 103A, 103B.

In still another embodiment, such as an embodiment shown in FIG. 31, a flight platform 101 may not have a propulsion propeller. In such embodiment, the flight platform 101 may be attached to a passenger pod or a cargo pod which is provided with a propulsion propeller. FIG. 32 illustrates an embodiment of a passenger pod having a propulsion propeller arranged at the rear end thereof. When the passenger pod is attached to the flight platform 101 of FIG. 31, the propulsion propeller propels the flight platform 101 forwards.

In one embodiment, two vertical stabilizers 106A, 106B may be arranged at positions near the rear ends of the linear supports 103A, 103B respectively. Although the vertical stabilizers are shown pointing downward, there may have embodiments in which the vertical stabilizers point upward.

In another embodiment, the main wings 104A, 104B may be respectively provided with wingtip lift propellers 109A, 109B arranged at the distal ends thereof. This may be achieved by providing the wingtip vertical stabilizers 110A, 110B at the distal ends of the main wings 104A, 104B, respectively, and having the lift propellers 109A, 109B arranged at the upper tips of the wingtip vertical stabilizers 110A, 110B. These wingtip lift propellers 109A, 109B may be relatively smaller than the lift propellers arranged on the linear supports 103A, 103B.

These wingtip lift propellers 109A, 109B may be used for efficiently and effectively controlling the roll of the unmanned aerial vehicle 100. These wingtip lift propellers 109A, 109B are located at the most distal positions away from the center axis of the unmanned aerial vehicle 100 and are effective in regulating the roll of the unmanned aerial vehicle 100, and may do so with a diameter smaller than those of the other lift propellers.

As further shown in FIG. 1b, there is a pod 130 normally attached beneath a main body 102 of the unmanned aerial vehicle 100.

Now referring to details in FIG. 2, the unmanned aerial vehicle 100 is expected to use any type of landing gear. In one embodiment, the unmanned aerial vehicle 100 may have four single leaf springs 112A, 112B, 112C, 112D as the landing gears. The front two single leaf springs 112A, 112C are respectively arranged at the distal ends of folding legs 111A, 111B. During the flight, the folding legs 111A, 111B may be respectively retracted into interior spaces of the left linear support 103A and the right linear support 103B.

The two single leaf left springs 112B, 112D at the rear side are expected to be respectively arranged at the distal ends of the bottoms of the vertical stabilizers 106A, 106B.

The expected single leaf springs 112A, 112B, 112C, 112D may be made of appropriate materials to provide enough elasticity and integrity, the materials comprise natural and synthetic polymers, various metals and metallic alloy, natural materials, textile fibers, and all reasonable combination thereof. In one embodiment, carbon fibers are used.

Now turning to FIG. 3, a pod used as a cargo pod 130 is illustrated. The cargo pod 130 may have single leaf springs 135A, 135B, 135C, 135D as landing gears thereof. Or, the cargo pod 130 may have other type of landing gear, for example, sliding rails, legs, and wheels.

In an expected embodiment, the cargo pod 130 may be detached from the other portion of the unmanned aerial vehicle 100. The other portion of the unmanned aerial vehicle may be called as a flight platform 101. The flight platform 101 may fly without carrying the pod, and may interchangeably carry different pods. As will be described later, the flight platform 101 may carry a passenger pod.

In an illustrated example, all pods 130, 140 may be carried beneath the flight platform 101. The pods 130, 140 are expected to be loaded on the ground, and the loading process may be completed before or after attaching the flight platform 101 to the pods 130, 140.

FIG. 5 illustrates a top view of a flight platform 101. The flight platform 101 may have a generally flat configuration, and capable of carrying a load therebelow or thereabove. During high-speed flight, all six lift propellers 108A, 108B, 108C, 108D, 108E, 108F may be locked in place, and thus each blade is parallel to the main body 102.

FIG. 5 illustrates one embodiment of a flight platform 101, wherein the length of each of the front wings 105A, 105B is not longer than a half of the length of each of the main wings 104A, 104B.

FIG. 6 depicts a front view of a flight platform 101 with a detachably attached cargo pod 130 in general. Whether the cargo pod 130, the passenger pod 140, or any other type of load, it is specifically expected that there may be an energy storage unit 150 arranged in the main body 102 of the flight platform. Stored energy may be used to power the other parts of the flight platform, such as the lift propellers 108A, 108B, 108C, 108D, and the propulsion propellers 107A, 107B. The stored energy may be electric power, and the storage unit is a battery. In another embodiment, the energy storage 150 may be used to power accessories in the pods 130, 140.

These batteries 150 may also be arranged in the other portions of the flight platform 101, such as in the linear supports 103A, 103B.

Alternatively or preferably, there may be energy storage units 155 arranged in the pods 130, 140. Energy stored in the storage units 155 may be used to power the lift propellers 108A, 108B, 108C, 108D, and the propulsion propellers 107A, 107B. The stored energy may be electric power, and the storage unit is a battery. By arranging the energy storage units 155 in the pods 130, 140, whenever the flight platform 101 is attached to new pods 130, 140, the flight platform 101 will have a supplemental energy source. The flight platform 101 itself may be an emergency energy store or a battery 150 with smaller capacity to supply power to the flight platform 101 for a relatively short period of time when the flight platform 101 is in flight without the pods 130, 140. In one embodiment, the main power supply of the flight platform 101 is from the batteries 150 located in the pods 130, 140. In this way, the flight platform 101 or the entire VTOL unmanned aircraft system 100 will have a fully charged energy source when the flight platform 101 replaces the old pods 130, 140 with the new pods 130, 140. This is a beneficial method without requiring the VTOL unmanned aerial vehicle to charge itself. In a preferred embodiment, the flight platform 101 may work/fly continuously for hours or even days to attach the cargo pod/passenger pod and detach the cargo pod/passenger pod without stopping to charge batteries thereof.

Now referring to the details of FIG. 7, a passenger pod 150 is provided. The passenger pod 150 may use any type of landing gear, such as rigid legs 145A, 145B, 145C, 145D as shown in the figure.

FIG. 10 depicts one aspect of the disclosure in general, wherein a pod (whether a cargo pod or a passenger pod) is detachable. Here, the passenger pod 140 may be selectively detached from the flight platform 101. The engagement and disengagement between the flight platform 101 and the pod 140 may be autonomously executed (without simultaneous user intervention) by a computer and/or other sensors and a calculation device. Alternatively or preferably, a user may actively control and guide the engagement and disengagement between the flight platform 101 and the pod 140.

As will be recognized by those of ordinary skill in the art, various types of engagement mechanisms 147 may be used to fix the pod 140 to the flight platform 101. For example, the engagement mechanism may be a mechanical latch, a magnetic latch, a track and groove, or a combination of any known engagement ways.

It is important to understand that, in addition to having two propulsion propellers 107A and 107B (as shown in FIG. 11), alternatively or alternatively, there may be a central propulsion propeller 117 which is connected to the rear end of the main body 102 (as shown in FIG. 12). As shown in FIG. 12, the central propulsion propeller 117 is engaged to the rear end of the main body 102 through a vertical expander 116. The vertical expander 116 may be any structure in any shape to physically engage with the propulsion propeller 117, thereby making a rotating center of the propulsion propeller 117 perpendicularly deviate from the main body 102. In still another embodiment, the propulsion propeller 117 perpendicularly deviates from the main body 102, thereby making the rotating center of the propulsion propeller 117 be perpendicularly located at a position at the rear portion of the pod 140 or be perpendicularly flushed with the pod 140. In another embodiment, the propulsion propeller 117 is perpendicularly flushed with the top of the pod 140. In another embodiment, the propulsion propeller 117 is perpendicularly flushed with the middle portion of the pod 140. In a further embodiment, the propulsion propeller 117 is perpendicularly flushed with the bottom of the pod 140.

What is not shown in any figure of the embodiment is the absence of the propulsion propellers 107A, 107B at the end parts of the linear supports 103A, 103B respectively. Instead, there may only be one propulsion propeller 117 engaged with the rear end of the main body 102.

It may also be contemplated that each of linear support 103A, 103B may comprise more than three lift propellers, which may be achieved by providing a longer linear support to accommodate more lift propellers, by using a lift propeller with smaller diameter, or by placing lift propellers on both the top and bottom sides of the linear support. One embodiment is illustrated in FIG. 13, wherein two additional lift propellers 108G 108H are arranged at the front ends of the bottoms of the linear supports 103A, 103B.

Although the propulsion propellers 107A, 107B have been illustrated in the previous figures to be positioned at the distal ends of the rear portions of the linear support 103A, 103B, it is particularly expected that these propulsion propellers 107A, 107B may be arranged at a horizontal plane lower than the main wings 104A, 104B, as those shown in FIG. 13. In one aspect, these propulsion propellers 107A, 107B may be arranged at a horizontal plane which is basically equal to pods 130, 140 carried by the flight platform. In another aspect, these propulsion propellers 107A, 107B may be arranged at the middles of the vertical stabilizers 106A, 106B. One expected reason for lowering the arrangement of the propulsion propellers 107A, 107B is to minimize head dipping effect during the flight, which may be caused by aerodynamic effects caused by the pods 130, 140.

FIG. 14 to FIG. 30 illustrate an embodiment in which a flight platform 101 or pods 130, 140, or both, may each have electric wheels 148 attached thereto. In an embodiment of FIG. 14, the flight platform 101 is provided with the electric wheels 148; and each of the pods 130, 140 is also provided with the electric wheels. Now referring to an embodiment of the FIG. 15, single electric wheel 148 unit may have a motor enclosed in a shell 149, and the motor may be driven the electric power supplied by the energy storage unit 150 arranged in each of the pods 130, 140.

It is contemplated that the electric wheels 148 may enable the flight platform 101 or the pod 130 to move on the ground when the flight platform and the pod are parked on the ground. This allows one of the pods 130, 140 to move away from the flight platform 101 and allows the other of the pods 130, 140 to move itself to the flight platform 101 for engagement.

Or, this may allow the flight platform 101 to be away from the pod 130 and to move towards another pod for engagement. In one embodiment, each of the pods 130, 140 may have an energy storage unit 155, and therefore, an energy source of the flight platform 101 is substantially supplemented when the flight platform 101 is engaged with a new and fully charged pod 130 or 140.

In certain embodiments of the disclosed unmanned aircraft system, at least one flotation device 160 may be provided, which is engaged with at least one of the cargo pod 130, the passenger pod 140, and the flight platform 101. The flotation device may be of the type that requires actuation, that is, active inflation with gas or through material when needed. In other words, in this particular embodiment, the flotation device 160 may remain in a deflated state and only expand when the inflation is triggered at certain conditions. For example, the flotation device 160 may automatically inflate during emergency landing, may automatically inflate when landing on water, and may inflate when any landing gear fails in certain aspects.

Many known types of inflation mechanisms or airbag mechanisms may be implemented to achieve the needs and configuration of the disclosed flotation device 160. The expected flotation device 160 may be of a type that can be repeatedly reused, re-inflated, and re-deflated. The expected flotation device 160 may be merely disposable.

Alternatively or preferably, an inflation behavior may be activated by a user. For example, when an operator of the unmanned aircraft system determines that the flotation device 160 needs to be inflated, he or she may send a signal to start the inflation.

It should be particularly noted in certain embodiments that the flotation device 160 does not need the electric wheel 148. In other embodiments, the flotation device 160 is a part of a shell of the electric wheel 148.

Referring to FIG. 26 as one example, a passenger pod 140 may have a lengthened type flotation device 160 arranged on any side of the pod 140, which may be used as a water landing gear. In FIG. 26, these flotation devices 160 are shown deflated. FIG. 32 illustrates a side view of the deflated flotation device 160. As shown in FIG. 33 and FIG. 34, the flotation devices 160 engaged with the passenger pod 140 are shown inflated.

Referring FIG. 31 as another example, the flight platform 101 may have four flotation devices 160 arranged on the tops of four electric wheels 148 respectively. These flotation devices 160 may be alternatively attached to the electric wheels 148 or close to the electric wheels 148 at the other positions. In FIG. 31, these flotation devices 160 engaged with the electric wheels 148 are shown deflated. FIG. 33 and FIG. 34 illustrate inflated flotation devices 160 of the flight platform 101.

Many variations and modifications may be made by those of ordinary skill in the art without departing from the spirit and scope of the disclosed embodiments. Thus, it must be understood that the illustrated embodiments are presented for the purpose of example only and should not be taken as limiting the embodiments defined by the appended technical solutions. For example, despite the fact that elements of the technical solutions are presented below in a certain combination, it must be expressly understood that the embodiment comprises other combinations of less, more or different elements, which are disclosed herein, even if such a combination is not initially defined.

Therefore, detailed embodiments and applications of a VTOL flight platform with interchangeable pods have been disclosed. However, it is apparent to those skilled in the art that more modifications in addition to those already described are possible without departing from the concepts disclosed herein. Thus, the disclosed embodiments are not limited except in the spirit of the appended technical solutions. In addition, in interpreting the specification and technical solutions, all terms should be interpreted as the broadest possible manner consistent with the context. Particularly, the terms "comprise" and "comprising" should be interpreted as referring to components, assemblies, or steps in a non-exclusive manner, indicating that the referenced components, assemblies, or steps may be present, or utilized, or combined with other components, assemblies, or steps that are not expressly referenced. Insubstantial variations from the claimed subject matter now known or later expected by those of ordinary skill in the art are expressly expected to be equivalent within the scope of the technical solutions. Thus, obvious replacements which are known at present or later to those of ordinary skill in the art are defined to be within the scope of the defined elements. Thus, the technical solutions should be understood to encompass what is specifically illustrated and described above, what is conceptually equivalent, what may be obviously replaced, and what essentially comprise the basic idea of the embodiments. In addition, in the case that the specification and technical solutions refer to at least one selected from a group consisting of A, B, C, . . . and N, the text should be interpreted as requiring at least one element of the group, including N, rather than A plus N, or B plus N, or the like.

What is claimed is:

1. A vertical takeoff and landing unmanned aerial vehicle, comprising:
a left main wing and a right main wing;
a main body which is engaged with the left main wing and the right main wing;
a left front wing and a right front wing which are engaged with the main body;
a left linear support which is engaged with the left main wing;
a first group of multiple lift propellers which are arranged on a top side of the left linear support;
a right linear support which is engaged with the right main wing;
a second group of multiple lift propellers which are arranged on a top side of the right linear support;
a left additional lift propeller which is arranged on a bottom side of the left linear support; and
a right additional lift propeller which is arranged on a bottom side of the right linear support; and
wherein a rotation coverage area of the left additional lift propeller overlaps with rotation coverage areas of two lift propellers in the first group of multiple lift propellers.

2. The vertical takeoff and landing unmanned aerial vehicle according to claim 1, further comprising a left vertical stabilizer which is arranged at a tail end of the left linear support, and a right vertical stabilizer which is arranged at a tail end of the right linear support.

3. The vertical takeoff and landing unmanned aerial vehicle according to claim 2, further comprising a top end lift propeller which is arranged at a top end of each of the left vertical stabilizer and the right vertical stabilizer.

4. The vertical takeoff and landing unmanned aerial vehicle according to claim 1, further comprising two wingtip propellers, wherein the two wingtip propellers are respectively arranged at a distal end of the left main wing and the right main wing.

5. The vertical takeoff and landing unmanned aerial vehicle according to claim 4, wherein one end, away from the main body, of each of the left main wing and the right main wing is provided with a wingtip vertical stabilizer, the wingtip vertical stabilizer is a plate-shaped structure which is vertically arranged and parallel to a longitudinal axis of the main body, each of the wingtip vertical stabilizer is respectively located on the left and right main wings and fixedly connected with the left and right main wings, and the two wingtip propellers are each arranged at a top end of the respective left and right wingtip vertical stabilizers.

6. The vertical takeoff and landing unmanned aerial vehicle according to claim 3, further comprising a traction propeller which is arranged at a front end of the main body.

7. The vertical takeoff and landing unmanned aerial vehicle according to claim 1, wherein the left main wing is connected to the left front wing through the left linear support, and the right main wing is connected to the right front wing through the right linear support.

8. The vertical takeoff and landing unmanned aerial vehicle according to claim 7, further comprising a pod which is attached to a bottom side of the main body.

9. The vertical takeoff and landing unmanned aerial vehicle according to claim 8, wherein the pod is a passenger pod.

10. The vertical takeoff and landing unmanned aerial vehicle according to claim 8, wherein the pod is a cargo pod.

11. The vertical takeoff and landing unmanned aerial vehicle according to claim 1, wherein a ratio of a weight increase percentage of the left additional lift propeller and the right additional lift propeller to an increase percentage of takeoff and landing power is 5-15%: 18-35%.

12. The vertical takeoff and landing unmanned aerial vehicle according to claim 11, wherein a ratio of a weight increase percentage of the left additional lift propeller and the right additional lift propeller to a lift increase percentage is 5-10%: 18-30%.

13. The vertical takeoff and landing unmanned aerial vehicle according to claim 12, wherein the ratio of the weight increase percentage of the left additional lift propeller and the right additional lift propeller to the lift increase percentage is 6%: 20-25%.

14. The vertical takeoff and landing unmanned aerial vehicle according to claim 13, wherein the ratio of the weight increase percentage of the left additional lift propeller and the right additional lift propeller to the lift increase percentage is 6%: 22%.

15. A vertical takeoff and landing unmanned aerial vehicle, comprising:
a left main wing and a right main wing;
a main body which is engaged with the left main wing and the right main wing;
a left front wing and a right front wing which are engaged with the main body;
a left linear support which is engaged with the left main wing;
a first group of multiple lift propellers which are arranged on a top side of the left linear support;
a right linear support which is engaged with the right main wing;
a second group of multiple lift propellers which are arranged on a top side of the right linear support;
a left additional lift propeller which is arranged on a bottom side of the left linear support; and
a right additional lift propeller which is arranged on a bottom side of the right linear support; and
further comprises a propulsion propeller which is arranged at a rear end of the main body.

16. A vertical takeoff and landing unmanned aerial vehicle, comprising:
a left main wing and a right main wing;
a main body which is engaged with the left main wing and the right main wing;
a left front wing and a right front wing which are engaged with the main body;
a left linear support which is engaged with the left main wing;
a first group of multiple lift propellers which are arranged on a top side of the left linear support;
a right linear support which is engaged with the right main wing;
a second group of multiple lift propellers which are arranged on a top side of the right linear support;
a left additional lift propeller which is arranged on a bottom side of the left linear support;
a right additional lift propeller which is arranged on a bottom side of the right linear support; and wherein the rotation coverage area of the left additional lift propeller overlaps with rotation coverage areas of the first two lift propellers in the first group of multiple lift propellers.

17. The vertical takeoff and landing unmanned aerial vehicle according to claim 16, further comprising a left vertical stabilizer arranged at a tail end of the left linear support, and a right vertical stabilizer arranged at a tail end of the right linear support.

18. The vertical takeoff and landing unmanned aerial vehicle according to claim 17, further comprising a top end lift propeller arranged at a top end of each of the left vertical stabilizer and the right vertical stabilizer.

19. The vertical takeoff and landing unmanned aerial vehicle according to claim 17, further comprising two wingtip propellers, wherein the two wingtip propellers are respectively arranged at a distal end of the left main wing and the right main wing.

20. The vertical takeoff and landing unmanned aerial vehicle according to claim 18, wherein a distal end of each of the left main wing and the right main wing is provided with a wingtip vertical stabilizer, the wingtip vertical stabilizer is a plate-shaped structure which is vertically arranged and parallel to a longitudinal axis of the main body, each of the wingtip vertical stabilizers is located on the respective left and right main wings and fixedly connected respectively with the left and right main wings, and each of the wingtip propellers is arranged at a top end of the respective wingtip vertical stabilizers.

21. The vertical takeoff and landing unmanned aerial vehicle according to claim 16, further comprising a traction propeller which is arranged at a front end of the main body.

22. The vertical takeoff and landing unmanned aerial vehicle according to claim 16, further comprising a pod which is attached to a bottom side of the main body.

23. The vertical takeoff and landing unmanned aerial vehicle according to claim 16, wherein a ratio of a weight increase percentage of the left additional lift propeller and the right additional lift propeller to an increase percentage of takeoff and landing power is 5-15%: 18-35%.

24. A vertical takeoff and landing unmanned aerial vehicle, comprising:
- a left main wing and a right main wing;
- a main body which is engaged with the left main wing and the right main wing;
- a left front wing and a right front wing which are engaged with the main body;
- a left linear support which is engaged with the left main wing;
- a first group of multiple lift propellers which are arranged on a top side of the left linear support;
- a right linear support which is engaged with the right main wing;
- a second group of multiple lift propellers which are arranged on a top side of the right linear support;
- a left additional lift propeller which is arranged on a bottom side of the left linear support;
- a right additional lift propeller which is arranged on a bottom side of the right linear support; and
- a pod attached to a bottom side of the main body.

* * * * *